US011222266B2

(12) United States Patent
Unsal et al.

(10) Patent No.: US 11,222,266 B2
(45) Date of Patent: Jan. 11, 2022

(54) SYSTEM AND METHOD FOR AUTOMATIC LEARNING OF FUNCTIONS

(71) Applicant: Intuit Inc., Mountain View, CA (US)

(72) Inventors: Cem Unsal, Alameda, CA (US); Saikat Mukherjee, Fremont, CA (US); Roger Charles Meike, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 1089 days.

(21) Appl. No.: 15/293,553

(22) Filed: Oct. 14, 2016

(65) Prior Publication Data

US 2018/0018582 A1    Jan. 18, 2018

Related U.S. Application Data

(63) Continuation-in-part of application No. 15/292,510, filed on Oct. 13, 2016, now Pat. No. 10,140,277.

(60) Provisional application No. 62/362,688, filed on Jul. 15, 2016.

(51) Int. Cl.
| | |
|---|---|
| *G06N 3/12* | (2006.01) |
| *G06N 20/00* | (2019.01) |
| *G06F 40/30* | (2020.01) |
| *G06F 40/166* | (2020.01) |
| *G06F 40/174* | (2020.01) |

(Continued)

(52) U.S. Cl.
CPC .......... *G06N 3/126* (2013.01); *G06F 40/166* (2020.01); *G06F 40/174* (2020.01); *G06F 40/205* (2020.01); *G06F 40/30* (2020.01); *G06N 3/123* (2013.01); *G06N 20/00* (2019.01); *G06Q 40/123* (2013.12)

(58) Field of Classification Search
CPC ...... G06N 20/00; G06N 3/123; G06Q 40/123; G06F 40/166; G06F 40/205; G06F 40/30; G06F 40/174
USPC ............................................................ 706/12
See application file for complete search history.

(56) References Cited

U.S. PATENT DOCUMENTS

| | | |
|---|---|---|
| 5,555,169 A | 9/1996 | Namba et al. |
| 6,246,977 B1 | 6/2001 | Messerly et al. |
| 6,912,536 B1 | 6/2005 | Ochitani |

(Continued)

FOREIGN PATENT DOCUMENTS

| | | |
|---|---|---|
| JP | 2013-164740 | 8/2013 |
| KR | 10-1585029 | 1/2016 |

(Continued)

OTHER PUBLICATIONS

Hermens, Leonard A., et al., "A Machine-Learning Apprentice for the Completion of Repetitive Forms," Feb. 1994, IEEE, pp. 28-33.

(Continued)

*Primary Examiner* — Tsu-Chang Lee
(74) *Attorney, Agent, or Firm* — Paradice and Li LLP

(57) ABSTRACT

A method and system learns functions to be associated with data fields of forms to be incorporated into an electronic document preparation system. The functions are essentially sets of operations required to calculate the data field. The method and system receive form data related to a data field that expects data values resulting from performing specific operations. The method and system utilize machine learning and training set data to generate, test, and evaluate candidate functions to determine acceptable functions.

16 Claims, 4 Drawing Sheets

(51) Int. Cl.
  *G06F 40/205* (2020.01)
  *G06Q 40/00* (2012.01)

(56) References Cited

U.S. PATENT DOCUMENTS

| | | | |
|---|---|---|---|
| 7,092,922 | B2 | 8/2006 | Meng et al. |
| 7,234,103 | B1 | 6/2007 | Regan |
| 7,251,781 | B2 | 7/2007 | Batchilo et al. |
| 7,254,569 | B2 | 8/2007 | Goodman et al. |
| 7,343,551 | B1 | 3/2008 | Bourdev |
| 7,500,178 | B1 | 3/2009 | O'Donnell |
| 7,561,734 | B1 | 7/2009 | Wnek |
| 7,660,779 | B2 | 2/2010 | Goodman et al. |
| 7,765,097 | B1 | 7/2010 | Yu et al. |
| 7,788,262 | B1 | 8/2010 | Shirwadkar |
| 7,853,494 | B2 | 12/2010 | Wyle |
| 8,032,822 | B1 | 10/2011 | Artamonov et al. |
| 8,082,144 | B1 | 12/2011 | Brown et al. |
| 8,214,362 | B1 | 7/2012 | Djabarov |
| 8,370,143 | B1 | 2/2013 | Coker |
| 8,515,972 | B1 | 8/2013 | Srikrishna et al. |
| 8,606,665 | B1* | 12/2013 | Shaw .................. G06Q 40/123 705/31 |
| 8,655,695 | B1 | 2/2014 | Qu et al. |
| 8,756,489 | B2 | 6/2014 | Richardt et al. |
| 9,069,745 | B2 | 6/2015 | Jacobsen et al. |
| 9,430,453 | B1 | 8/2016 | Ho |
| 9,652,562 | B2 | 5/2017 | Barrus |
| 9,892,106 | B1 | 2/2018 | Lesner et al. |
| 2002/0083068 | A1 | 6/2002 | Quass et al. |
| 2003/0026459 | A1 | 2/2003 | Won et al. |
| 2003/0036912 | A1 | 2/2003 | Sobotta et al. |
| 2003/0233296 | A1 | 12/2003 | Wagner |
| 2004/0030540 | A1 | 2/2004 | Ovil et al. |
| 2004/0039988 | A1 | 2/2004 | Lee et al. |
| 2005/0108406 | A1 | 5/2005 | Lee |
| 2005/0108630 | A1 | 5/2005 | Wasson et al. |
| 2005/0125746 | A1 | 6/2005 | Viola et al. |
| 2005/0235811 | A1 | 10/2005 | Dukane |
| 2005/0257148 | A1 | 11/2005 | Goodman et al. |
| 2005/0267869 | A1 | 12/2005 | Horvitz et al. |
| 2006/0062451 | A1* | 3/2006 | Li ........................ G06K 9/6256 382/159 |
| 2006/0111990 | A1 | 5/2006 | Cohen et al. |
| 2006/0155539 | A1 | 7/2006 | Chen et al. |
| 2006/0178961 | A1 | 8/2006 | Stanley et al. |
| 2006/0182554 | A1 | 8/2006 | Stoizer |
| 2006/0184870 | A1 | 8/2006 | Christen et al. |
| 2006/0235811 | A1 | 10/2006 | Fairweather |
| 2006/0242180 | A1 | 10/2006 | Graf et al. |
| 2007/0130134 | A1 | 6/2007 | Ramsey et al. |
| 2007/0299949 | A1* | 12/2007 | Macbeth ............. G10L 15/1822 709/223 |
| 2008/0065634 | A1 | 3/2008 | Krinsky |
| 2008/0104506 | A1 | 5/2008 | Farzindar |
| 2008/0147528 | A1 | 6/2008 | Talan et al. |
| 2008/0154824 | A1 | 6/2008 | Weir et al. |
| 2008/0227075 | A1 | 9/2008 | Poor et al. |
| 2008/0270110 | A1 | 10/2008 | Yurick et al. |
| 2008/0313174 | A1 | 12/2008 | Barve et al. |
| 2009/0089046 | A1 | 4/2009 | Uchimoto et al. |
| 2009/0119107 | A1 | 5/2009 | Duncan |
| 2009/0119234 | A1 | 5/2009 | Pinckney et al. |
| 2009/0182554 | A1 | 7/2009 | Abraham et al. |
| 2009/0204881 | A1 | 8/2009 | Murthy et al. |
| 2009/0276729 | A1 | 11/2009 | Cantu-Paz |
| 2009/0327513 | A1 | 12/2009 | Guo et al. |
| 2010/0005096 | A1 | 1/2010 | Minagawa et al. |
| 2011/0087671 | A1 | 4/2011 | Lee et al. |
| 2011/0258182 | A1 | 10/2011 | Singh et al. |
| 2011/0271173 | A1 | 11/2011 | Ait-Mokhtar et al. |
| 2012/0089659 | A1 | 4/2012 | Halevi et al. |
| 2012/0272160 | A1 | 10/2012 | Spivack et al. |
| 2013/0013612 | A1 | 1/2013 | Fittges et al. |
| 2014/0019433 | A1 | 1/2014 | Effrat et al. |
| 2014/0122988 | A1 | 5/2014 | Eigner et al. |
| 2014/0164352 | A1 | 6/2014 | Denninghoff |
| 2014/0173406 | A1 | 6/2014 | Robelin et al. |
| 2014/0201126 | A1 | 7/2014 | Zadeh et al. |
| 2014/0207782 | A1 | 7/2014 | Ravid |
| 2014/0223277 | A1 | 8/2014 | Kimber et al. |
| 2014/0258825 | A1 | 9/2014 | Ghosh et al. |
| 2014/0280166 | A1 | 9/2014 | Bryars et al. |
| 2014/0282586 | A1* | 9/2014 | Shear .................... G06F 16/285 718/104 |
| 2015/0007007 | A1 | 1/2015 | Bryon et al. |
| 2015/0046785 | A1 | 2/2015 | Byron et al. |
| 2015/0058188 | A1 | 2/2015 | Bartlett et al. |
| 2015/0095753 | A1 | 4/2015 | Gajera et al. |
| 2015/0127567 | A1 | 5/2015 | Menon et al. |
| 2015/0206067 | A1 | 7/2015 | Abu-Mostafa et al. |
| 2015/0254225 | A1 | 9/2015 | Chirca |
| 2015/0309992 | A1 | 10/2015 | Visel |
| 2015/0317295 | A1 | 11/2015 | Sherry et al. |
| 2016/0019197 | A1 | 1/2016 | Iasi et al. |
| 2016/0092557 | A1 | 3/2016 | Stojanovic et al. |
| 2016/0117542 | A1 | 4/2016 | Klappert et al. |
| 2017/0075873 | A1 | 3/2017 | Shetty et al. |
| 2017/0220540 | A1 | 8/2017 | Wang et al. |
| 2017/0228655 | A1 | 8/2017 | Alarie et al. |
| 2017/0239576 | A1 | 8/2017 | Hsiao |
| 2017/0293607 | A1 | 10/2017 | Kolotienko et al. |
| 2017/0337176 | A1 | 11/2017 | Cietwierkowski et al. |
| 2018/0018310 | A1 | 1/2018 | Unsal |
| 2018/0018311 | A1 | 1/2018 | Mukherjee et al. |
| 2018/0018322 | A1 | 1/2018 | Mukherjee et al. |
| 2018/0018676 | A1 | 1/2018 | Mukherjee et al. |
| 2018/0018740 | A1 | 1/2018 | Unsal et al. |
| 2018/0018741 | A1 | 1/2018 | Mukherjee et al. |
| 2018/0032497 | A1 | 2/2018 | Mukherjee et al. |
| 2018/0053120 | A1 | 2/2018 | Mukherjee et al. |
| 2018/0121337 | A1 | 5/2018 | Unsal et al. |
| 2018/0341839 | A1 | 11/2018 | Malak et al. |
| 2020/0159990 | A1 | 5/2020 | Mukherjee et al. |

FOREIGN PATENT DOCUMENTS

| | | |
|---|---|---|
| WO | 02103555 A1 | 12/2002 |
| WO | WO 2009-061917 | 5/2009 |

OTHER PUBLICATIONS

Zhang, Chi, "Genetic Programming for Symbolic Regression," 2015, University of Tennessee, Knoxville, TN 37966, USA.

Toda et al., "A Probabilistic Approach for Automatically Filling Form-Based Web Interfaces," Proceedings of the VLDB Endowment, vol. 4, No. 3, pp. 151-160, (Year: 2010).

Zhai et al., "Machine Translation by Modeling Predicate-Argument Structure Transformation," Proceedings of COLING 2012: Technical Papers, pp. 3019-3036, COLING 2012, Mumbai, Dec. 2012.

Glushko, Robert J., et al., "Document Engineering for e-Business," DocEng '02, Nov. 2002, USA, copyright 2002 ACM, p. 42-48.

Drummond et al., "Examining the Impacts of Dialogue Content and System Automation on Affect Models in a Spoken Tutorial Dialogue System," Proceedings of the SIGDAL 2011: the 12th Annual Meeting of the Special Interest Group on Discourse and Dialogue, pp. 312-318, Jun. 2011, copyright 2011 ACM, (Year: 2011).

Middleton et al., "Capturing Knowledge of User Preferences: Ontologies in Recommender Systems," K-CAP '01 pp. 100-107, copyright 2001, ACM (Year: 2001).

Wang et al., Action Prediction and Identification From Mining Temporal User Behaviors, WSDM'11, Feb. 9-12, 2011, Hong Kong, China, Copyright 2011 ACM, pp. 435-444, (Year: 2011).

Researchgate, "Thread of Question and Answers on generating training set data from ResearchGate," Retrieved from https://www.researchgate.net/post/How_can_I_generate_the_training_data_from_the_dataset_of_images, Questions and Answers, dated Jul. 2015, p. 1-5 (Year: 2015).

Anonymous, "Form 2441—Child and Dependent Care Expenses," Retrieved from the Internet on Feb. 12, 2020 <URL: http://taxhow.net/static/form/pdf/federal/1580446800/12441-2016.pdf>, 2-pages, (Year: 2016).

(56) References Cited

OTHER PUBLICATIONS

Borovicka et al., "Selecting Representative Data Sets," Advances in Data Mining Knowledge Discovery and Applications, Chap. 2, pp. 43-70, 2012.
Drechsler et al., "Generating Formal System Models from Natural Language Descriptions," IEEE, pp. 164-165 (Year 2012).
Kordos et al., "Instance Selection with Neural Networks for Regression Problems," Artificial Neural Networks and Machine Learning, ICANN 2012, Lecture Notes in Computer Science, vol. 7553, 8-pages.
Yan et al., Formal Consistency Checking over Specifications in Natural Languages, Design, Automation & Test in Europe Conference & Exibition (DATE), pp. 1677-1682 (Year: 2015).
Chu et al., "Data Cleaning: Overview and Emerging Challenges," Proceedings of the 2016 International Conference on Management of Data, pp. 2201-2206, Jun. 2016.
Frantzi, et al., "Automatic Recognition of Multi-Word Terms: The c-value/nc-value Method," International Journal on Digital Libraries 3.2, pp. 115-130, 2000.
Nakagawa et al., "A Simple but Powerful Automatic Term Extraction Method," COLING-02: COMPUTERM 2002: Second International Workshop on Computational Terminology, 7-pages, 2002.

\* cited by examiner

SYSTEM AND METHOD FOR AUTOMATIC LEARNING OF FUNCTIONS

RELATED CASES

This application is a Utility application depending from the U.S. provisional patent application filed Jul. 15, 2016, Ser. No. 62/362,688, and entitled SYSTEM AND METHOD FOR MACHINE LEARNING OF CONTEXT OF LINE INSTRUCTIONS FOR VARIOUS DOCUMENT TYPES which is hereby incorporated herein by reference in its entirety as if its contents were presented herein directly.

This application is a Utility application depending from a patent application filed Oct. 13, 2016, Ser. No. 15/292,510, and entitled SYSTEM AND METHOD FOR SELECTING DATA SAMPLE GROUPS FOR MACHINE LEARNING OF CONTEXT OF DATA FIELDS FOR VARIOUS DOCUMENT TYPES AND/OR FOR TEST DATA GENERATION FOR QUALITY ASSURANCE SYSTEMS naming inventor Cem Unsal, which is hereby incorporated herein by reference in its entirety as if the contents were presented herein directly.

BACKGROUND

Many people use electronic document preparation systems to help prepare important documents electronically. For example, each year millions of people use an electronic document preparation system customized for tax, i.e. an electronic tax return preparation system, to help prepare and file their tax returns. Typically, electronic tax return preparation systems receive tax related information from a user and then automatically populate the various fields in electronic versions of government tax forms. Electronic tax return preparation systems represent a potentially flexible, highly accessible, and affordable source of tax return preparation assistance for customers. However, processes that enable the electronic tax return preparation systems to automatically populate various data fields of the tax forms often utilize large amounts of computing system and human resources.

For instance, due to changes in tax laws, or due to updates in government tax forms, tax forms can change from year to year, or even multiple times in a same year. If a tax form changes due to an update, or a new tax form is introduced, it can be very difficult to efficiently update the electronic tax return preparation system to correctly determine tax data appropriate for and populate the various fields of the tax forms with required values. For example, a particular line of an updated tax form may require an input according to a function that uses values from other lines of the tax form and/or values from other tax forms or worksheets. These functions range from very simple to very complex. Updating the electronic tax return preparation system often thus includes utilizing a combination of tax experts, software and system engineers, and large amounts of computing resources to incorporate the new functions and form into the electronic tax return preparation system. This can lead to delays in releasing an updated version of the electronic tax return preparation system as well as considerable expenses. These delays and expenses are then passed on to customers of the electronic tax return preparation system. Furthermore, these processes for updating electronic tax returns can introduce inaccuracies into the tax return preparation system.

These expenses, delays, and possible inaccuracies can have an adverse impact on traditional electronic tax return preparation systems. Customers may lose confidence in the electronic tax return preparation systems. Furthermore, customers may simply decide to utilize less expensive options for preparing their taxes.

These issues and drawbacks are not limited to electronic tax return preparation systems. Any electronic document preparation system that assists users to electronically fill out forms or prepare documents can suffer from these drawbacks when the forms are updated or new and/or updated forms are released. This a longstanding technical problem existing in many computing fields.

SUMMARY

Embodiments of the present disclosure provide a technical solution to the longstanding problems discussed herein, and thus solve some of the shortcomings associated with traditional electronic document preparation systems by providing methods and systems for automatically incorporating new or updated forms by utilizing machine learning using genetic programming and genetic algorithms in conjunction with training set data. In particular, embodiments of the present disclosure receive form data of or related to a new or updated form that includes data fields to be completed. Embodiments of the present disclosure determine one or more possible dependencies for one or more data fields. Embodiments of the present disclosure utilize machine learning and genetic algorithms to quickly and accurately determine an acceptable function needed to complete the one or more data fields.

Embodiments of the present disclosure gather training set data that includes previously filled forms related to the new and/or updated form in order to assist in the machine learning process. The training set data may also include fabricated data prepared by human users reviewing the form. The machine learning process for learning and incorporating the new and/or updated form includes generating candidate functions for one or more data fields of the new and/or updated form. In one embodiment, the generation of the candidate functions takes into account the one or more possible dependencies. The candidate functions include, in various embodiments, one or more operators selected from a set of operators including logical, mathematical, and other functionality. The machine learning process applies the candidate functions to the training set data in order to determine the accuracy of the candidate functions.

For each data field, embodiments of the present disclosure generate and apply candidate functions in successive iterations until an acceptable candidate function is found that produces results that match the data values in the corresponding completed data fields of the previously filled forms of the training set data within an acceptable threshold margin of error.

In one embodiment, a fitness function is used to determine whether one or more candidate functions are acceptable and/or to determine a degree of acceptability. In this disclosure, degree of acceptability and margin of error are used for similar purposes and can be view as alternatives or equivalents of each other. In one embodiment, the fitness function includes consideration of an error function. An error function, for example, is, in one embodiment, a square root of the sum of the squares of the differences between the desired output of a candidate function and the actual output of the candidate function, for each data set of the training set data, as discussed below. Other considerations included in a fitness function, according to various embodiments, include one or more of how many operators are present in the candidate function, how many operators depend on results of other operators completing prior operations, whether there are missing arguments in the candidate function, and whether an argument is repeated in the candidate function. Any of these considerations may be present in a fitness function or error function in any combination suitable for a given implementation of the process operations disclosed herein, while remaining within the scope of the teachings presented herein.

Embodiments of the present disclosure then output results data that indicates that an acceptable function for a particular data field has possibly been found. This process is repeated for other data fields of the new and/or updated form until all desired data fields of the new and/or updated form have been learned and incorporated. In this way, embodiments of the present disclosure provide a more reliable electronic document preparation system that quickly, efficiently, and reliably learns and incorporates the new or updated forms.

In one embodiment, the dependencies for a given data field of the new and/or updated form includes references to data values from one or more other data fields of the new and/or updated form. In one embodiment, the dependencies for a given data field of the new and/or updated form includes references to data values from other data fields of one or more other old, new, or updated forms, worksheets, or data values from other locations internal or external to the electronic document management system. In one embodiment, the dependencies include one or more constants.

In one embodiment, an acceptable function for a given data field of the new and/or updated form includes operators that operate on one or more of the dependencies in a particular manner. The operators include, in various embodiments, arithmetic operators such as addition, subtraction, multiplication, division or other mathematical operators. The operators can include exponential functions. The operators can include logical operators such as if-then and/or if-then-else operators, and/or Boolean operators such as true/false. The operators can include existence condition operators that depend on the existence of a data value in another data field of new and/or updated form, in a form other than the new and/or updated form, or in some other location or data set. The operators can include string comparisons and/or rounding or truncating operations.

In one embodiment, the machine learning process generates and tests thousands of candidate functions very rapidly in successive iterations. The machine learning process can utilize one or more algorithms to generate candidate functions based on the one or more possible dependencies and/or other factors. The machine learning process is further configured to generate new candidate functions based on previously tested candidate functions that trended toward being a good match for the training set data.

In one embodiment, the machine learning process can generate and test candidate functions and then generate results data that indicates how closely the candidate functions matched the training set data. The machine learning process pauses awaiting input from an expert or other human or nonhuman resource indicating that an acceptable function has been found or otherwise indicating that further candidate functions should be generated and tested. The results data can indicate candidate functions that are likely acceptable or otherwise correct based on the training set data. Additionally, or alternatively, the results data can indicate a predefined number of the candidate functions that best matched the training set data. Additionally, or alternatively, the results data can indicate the results from all of the candidate functions that were tested.

In one embodiment, the electronic document preparation system is or otherwise includes an electronic tax return preparation system. When a state or federal government introduces a new or updated tax form, the tax return preparation system utilizes machine learning in conjunction with training set data that includes historical tax related data of previously prepared tax returns in order to quickly and efficiently learn and incorporate the new or updated tax form into the tax return preparation system. The tax return preparation system generates, for each of the one or more data fields of the new or updated tax form, candidate functions in order to find an acceptable function that, when used with the training data, results in a correct data value for the data field. Thus, the tax return preparation system applies one or more candidate functions to the historical tax related data in order to find a function that provides data values that match or closely match the data values in the completed data fields of the historical tax related data. The historical tax related data can include historical tax returns that have been prepared and filed with a state or federal government. The historical tax return data can include historical tax returns that have been accepted by a state or federal government agency or otherwise validated.

In some cases, it may not be feasible to obtain relevant historical tax related data of previously filed tax returns to assist in the machine learning process of a new or updated tax form. In these cases, the training set data includes fabricated data of tax returns completed by users, professionals, other tax return preparation systems, and/or human or nonhuman resources, using real or fabricated financial data.

As a specific illustrative example, it is typical for a tax form, as one example, to include one or more lines where a user of the form must fill in input fields associated with individual ones of those lines according to instructions associated with each line. In one example related to learning the best function for a single data field of a new tax form, the tax return preparation system generates one or more candidate functions. The tax return preparation system generates test data by applying the candidate function to the historical tax return data. In particular, the tax return preparation system applies the candidate function to the historical tax related data associated with each of a plurality of previously filled tax forms that are related to the new or updated tax form. The test data includes a test value for the specific line for each of the previously filled forms. The tax return preparation system generates matching data that indicates the degree to which the test values match the actual data values in the specific line of each of the historical tax returns. For example, the matching data may include an error determination reflecting how closely the test values match the data values of the historical tax return data for the specific line being considered.

If the test data matches the actual data values in the specific line of the historical tax returns beyond a threshold margin of error, then the tax return preparation system concludes that the candidate function is acceptable.

In one embodiment, a fitness function is used to determine that one or more candidate functions are acceptable. In one embodiment, the fitness function includes an error function, such as a root mean square error function, reflecting errors that may be present in test data associated with one or more data sets of the training set data, as discussed herein. Other error functions currently known to those of ordinary skill or later developed may be used without departing from the scope of this disclosure. Other components of a fitness function include, according to various embodiments, one or more of how many operators are present in the candidate function, how many operators depend on results of other operators completing prior operations, whether there are missing arguments in the candidate function, and whether an argument is repeated in the candidate function. The tax return preparation system then generates results data indicating whether the candidate function is acceptable and/or a fitness score, determined using a fitness function or an error function, or both, which may be used in a determination of a level of fitness, or a determination of a level of acceptability, for example.

In various embodiments, the electronic document preparation system is a financial document preparation system other than a tax return preparation system. The financial document preparation system can include, for example, an invoice preparation system, a receipt preparation system, a payroll document preparation system, or any other type of electronic document preparation system. Furthermore, principles of the present disclosure are not limited to electronic document preparation systems but can extend to other types of systems that assist users in filling out forms or other types of documents.

Embodiments of the present disclosure address some of the shortcomings associated with traditional electronic document preparation systems that do not adequately and efficiently incorporate new or updated forms. An electronic document preparation system in accordance with one or more embodiments provides efficient and reliable incorporation of new and/or updated forms by utilizing machine learning in conjunction with training set data in order to quickly and accurately incorporate and learn functions associated with those new and/or updated forms. The various embodiments of the disclosure can be implemented to improve the technical fields of data processing, resource management, data collection, and user experience. Therefore, the various described embodiments of the disclosure and their associated benefits amount to significantly more than an abstract idea. In particular, by utilizing machine learning to learn and incorporate new and/or updated forms in an electronic document preparation system, users can save money and time and can better manage their finances.

Using the disclosed embodiments of a method and system for learning and incorporating new and/or updated forms in an electronic document preparation system, a method and system for learning and incorporating new and/or updated forms in an electronic document preparation system more accurately is provided. Therefore, the disclosed embodiments provide a technical solution to the long standing technical problem of efficiently learning and incorporating new and/or updated forms in an electronic document preparation system.

In addition, the disclosed embodiments of a method and system for learning and incorporating new and/or updated forms in an electronic document preparation system are also capable of dynamically adapting to constantly changing fields such as tax return preparation and other kinds of document preparation. Consequently, the disclosed embodiments of a method and system for learning and incorporating new and/or updated forms in an electronic document preparation system also provide a technical solution to the long standing technical problem of static and inflexible electronic document preparation systems.

The result is a much more accurate, adaptable, and robust method and system for learning and incorporating new and/or updated forms in an electronic document preparation system, but thereby serves to bolster confidence in electronic document preparation systems. This, in turn, results in: less human and processor resources being dedicated to analyzing new and/or updated forms because more accurate and efficient analysis methods can be implemented, i.e., fewer processing and memory storage assets; less memory and storage bandwidth being dedicated to buffering and storing data; less communication bandwidth being utilized to transmit data for analysis.

The disclosed method and system for learning and incorporating new and/or updated forms in an electronic document preparation system does not encompass, embody, or preclude other forms of innovation in the area of electronic document preparation systems. In addition, the disclosed method and system for learning and incorporating new and/or updated forms in an electronic document preparation system is not related to any fundamental economic practice, fundamental data processing practice, mental steps, or pen and paper based solutions, and is, in fact, directed to providing solutions to new and existing problems associated with electronic document preparation systems. Consequently, the disclosed method and system for learning and incorporating new and/or updated forms in an electronic document preparation system, does not encompass, and is not merely, an abstract idea or concept.

Figure 1:
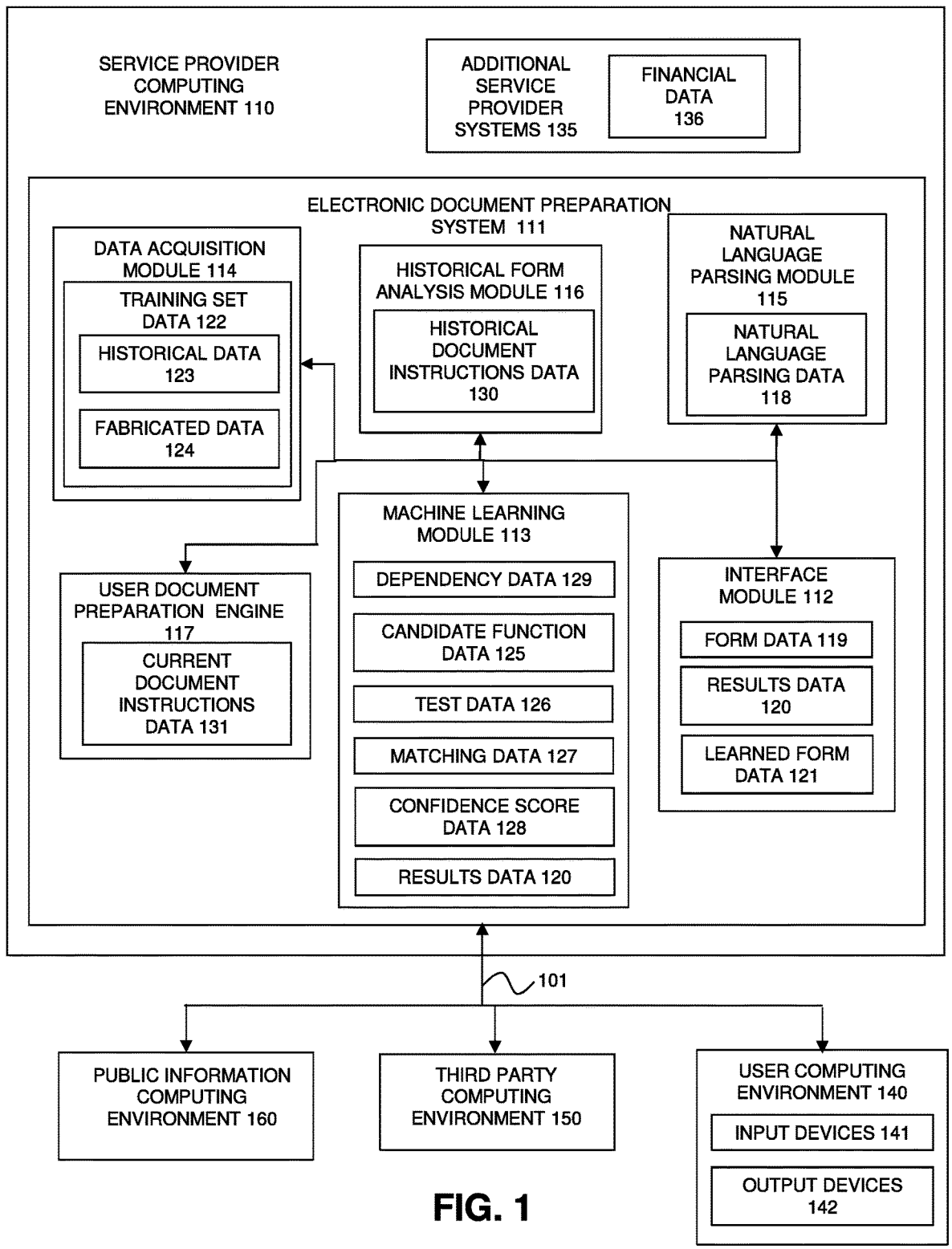
FIG. 1 is a block diagram of software architecture for learning and incorporating new and/or updated forms in an electronic document preparation system, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system. In one or more embodiments, there may be different parties noted that perform different levels of tasks, such as a user filling in a form supplied through an electronic document system managed, operated or otherwise controlled by a third party, such as a business entity.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed electronic document preparation system determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

Hardware Architecture

FIG. 1 illustrates a block diagram of a production environment 100 for learning and incorporating new and/or updated forms in an electronic document preparation system, according to one embodiment. Embodiments of the present disclosure provide methods and systems for learning and incorporating new and/or updated forms in an electronic document preparation system.

In particular, embodiments of the present disclosure receive form data related to a new and/or updated form having data fields to be completed according to instructions set forth in the new and/or updated form and utilize machine learning to correctly learn one or more functions equivalent to or otherwise represented by those instructions for each data field. Those learned functions are then incorporated into the electronic document preparation system.

Embodiments of the present disclosure gather training set data including previously filled forms related to the new and/or updated form, and/or including fabricated data as discussed herein. One or more embodiments of the present disclosure generate, for one or more data fields needing a new learned function, dependency data that indicates one or more dependencies likely to be included in an acceptable function for the data field.

Embodiments of the present disclosure utilize machine learning systems and processes to generate candidate functions for data fields to be learned. The candidate functions may be based on the one or more dependencies and can include one or more operators selected from a set of operators. The operators can operate on one or more of the possible dependencies and training set data. Embodiments of the present disclosure generate test data, i.e. output data, for each candidate function by applying the candidate function to one or more dependencies and/or the training set data.

Embodiments of the present disclosure compare the test data to the data values in the corresponding fields of the previously filled forms of the training set data or of the fabricated data. Embodiments of the present disclosure generate matching data indicating how closely the test data matches the data values of the previously filled forms of the training set data and/or how closely the test data matches the fabricated data.

In one embodiment, in a system wherein many candidate functions are generated and tested, components of a predetermined number of candidate functions that match the training set data better than other candidate functions may be used to generate new candidate functions which are then tested. In one embodiment, a component of a new candidate function includes one or more operators of the candidate function. In one embodiment, a component of a new candidate function includes one or more constants of the candidate function. In one embodiment, a component of a new candidate function includes one or more dependencies used to generate the candidate function.

In one embodiment, one or more of the predetermined number of candidate functions that match the training set data better than other candidate functions are split into two or more components each, and the split components recombined into new candidate functions that are then tested to determine how well test data generated from those new candidate functions match the training set data. One or more of those new candidate functions that are determined to generate test data that match the training set data better than the original candidate functions are then again split, if desired, and recombined into a second set of new candidate functions, and so on, until the resulting candidate functions produce test data that are deemed to match the training set data within a predetermined margin of error, as discussed herein. Thus, machine learning module 113 learns the components of the best functions and uses those components to quickly iterate towards an optimum solution.

In one embodiment, the machine learning processes continues generating candidate functions and test data until either one or more determined candidate functions are found that provide test data that matches the completed fields of the training set data within a predefined margin of error or until the process is terminated.

Embodiments of the present disclosure generate results data that indicates the best determined candidate functions for each data field of the new and/or updated form, based on how well test data from the best functions match the training set data. Embodiments of the present disclosure can output the results data for review by users who can review and approve the determined functions.

Additionally, or alternatively, embodiments of the present disclosure can determine when one or more acceptable candidate functions have been found and/or when the new and/or updated form has been entirely learned and can incorporate the new and/or updated form into a user document preparation engine so that users or customers of the electronic document preparation system can utilize the electronic document preparation system to electronically prepare documents involving the learned functions. By utilizing machine learning to learn and incorporate new and/or updated forms, efficiency of the electronic document preparation system is increased.

In addition, the disclosed method and system for learning and incorporating new and/or updated forms in an electronic document preparation system provides for significant improvements to the technical fields of electronic financial document preparation, data processing, data management, and user experience.

In addition, as discussed above, the disclosed method and system for learning and incorporating new and/or updated forms in an electronic document preparation system provide for the processing and storing of smaller amounts of data, i.e., more efficiently acquire and analyze forms and data, thereby eliminating unnecessary data analysis and storage. Consequently, using the disclosed method and system for learning and incorporating new and/or updated forms in an electronic document preparation system results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for learning and incorporating new and/or updated forms in an electronic document preparation system.

In one embodiment, production environment 100 includes service provider computing environment 110, user computing environment 140, third party computing environment 150, and public information computing environments 160, for learning and incorporating new and/or updated forms in an electronic document preparation system, according to one embodiment. Computing environments 110, 140, 150, and 160 are communicatively coupled to each other with one or more communication channels 101, according to one embodiment.

Service provider computing environment 110 represents one or more computing systems such as a server or distribution center that is configured to receive, execute, and host one or more electronic document preparation systems (e.g., applications) for access by one or more users, for learning and incorporating new and/or updated forms in an electronic document preparation system, according to one embodiment. Service provider computing environment 110 represents a traditional data center computing environment, a virtual asset computing environment (e.g., a cloud computing environment), or a hybrid between a traditional data center computing environment and a virtual asset computing environment, according to one embodiment.

Service provider computing environment 110 includes electronic document preparation system 111 configured to provide electronic document preparation services to a user.

According to various embodiments, electronic document preparation system 111 is a system that assists in preparing financial documents related to one or more of tax return preparation, invoicing, payroll management, billing, banking, investments, loans, credit cards, real estate investments, retirement planning, bill pay, and budgeting. Electronic document preparation system 111 can be a tax return preparation system or other type of electronic document preparation system. Electronic document preparation system 111 can be a standalone system that provides financial document preparation services to users. Alternatively, electronic document preparation system 111 can be integrated into other software or service products provided by a service provider.

In one embodiment, electronic document preparation system 111 assists users in preparing documents related to one or more forms that include data fields to be completed by the user. The data fields may require data entries in accordance with specified instructions which can be represented by functions. Once the electronic document preparation system has learned functions that produce the required data entries for the data fields, the electronic document preparation system can assist individual users in electronically completing the form.

In many situations, such as in tax return preparation situations, state and federal governments or other financial institutions issue new or updated versions of standardized forms each year or even several times within a single year. Each time a new and/or updated form is released, electronic document preparation system 111 needs to learn the specific functions that provide the required data entries for one or more data fields in the new and/or updated form.

If these data fields are not correctly completed, there can be serious financial consequences for users. Furthermore, if electronic document preparation system 111 does not quickly learn and incorporate new and/or updated forms into electronic document preparation system 111, users of the electronic document preparation system 111 may turn to other forms of financial document preparation services. In traditional electronic document preparation systems, new and/or updated forms are learned and incorporated by financial professionals and/or experts manually reviewing the new and/or updated forms and manually revising software instructions to incorporate the new and/or updated forms. In some cases, this can be a slow, expensive, and unreliable system. Manually revising software instructions can take many man hours over many days or weeks, depending on the extent of the changes. Electronic document preparation system 111 of the present disclosure advantageously utilizes machine learning in addition to training set data in order to quickly and efficiently learn functions related to data fields of a form and incorporate those functions into electronic document preparation system 111.

According to one embodiment, electronic document preparation system 111 receives form data related to a new form or updated version of a previously known form. Electronic document preparation system 111 analyzes the form data and identifies data fields of the form. Electronic document preparation system 111 acquires training set data that is related to the new or updated version of the form. The training set data can include historical data of or related to previously prepared documents including copies of the form, or a related form, with one or more completed data fields. The previously prepared documents can include previously prepared documents that have already been filed and approved with government or other institutions, or that were otherwise validated or approved.

Additionally, or alternatively, the training set data can include fabricated data that includes previously prepared documents using fictitious data or real data that has been scrubbed of personal identifiers or otherwise altered. Electronic document preparation system 111 utilizes machine learning in combination with the training set data to learn the functions that provide data entries for the data fields of the new and/or updated form.

In one embodiment, electronic document preparation system 111 identifies one or more dependencies for each data field to be learned. These dependencies can include one or more data values from other data fields of the new and/or updated form, one or more data values from another related form or worksheet, one or more constants, or many other kinds of dependencies that can be included in an acceptable function for a particular data field.

Electronic document preparation system 111 can identify the one or more possible dependencies based on natural language parsing of the descriptive text included in the new and/or updated form and related to the data field needing a new function to be learned. Electronic document preparation system can identify one or more possible dependencies by analyzing software from previous electronic document preparation systems that processed forms related to the new and/or updated form. Electronic document preparation system 111 can identify possible dependencies by receiving data from an expert, from a third party, or from another source.

In one embodiment, electronic document preparation system 111 generates, for each data field to be learned, one or more candidate functions based on the one or more dependencies and including one or more operators from a set of operators. Operators may represent any Boolean, logical and/or mathematical operation, or any combination thereof.

In one embodiment, once one or more candidate functions are generated, electronic document preparation system 111 generates test data by applying the candidate functions to the training set data.

Electronic document preparation system 111 then generates matching data that indicates how closely the test data matches the training set data. When electronic document preparation system 111 finds a candidate function that results in test data that matches or closely matches the training set data within a predetermined margin of error, electronic document preparation system 111 can determine that the candidate function is an acceptable function for the particular data field of the new and/or updated form. In one embodiment, a fitness function is used to determine that one or more candidate functions are acceptable. In one embodiment, the fitness function includes an error function, such as a root mean square error function, reflecting errors that may be present in test data associated with one or more data sets of the training set data, as discussed herein. Other error functions currently known to those of ordinary skill or later developed may be used without departing from the scope of this disclosure. Other components of a fitness function include, according to various embodiments, one or more of how many operators are present in the candidate function, how many operators depend on results of other operators completing prior operations, whether there are missing arguments in the candidate function, and whether an argument is repeated in the candidate function. The tax return preparation system then generates results data indicating whether the candidate function is acceptable and/or a fitness score, determined using a fitness function or an error function, or both, which may be used in a determination of a level of fitness, or a determination of a level of acceptability, for example In one embodiment, electronic document preparation system 111 can generate and output results data for review. The results data can include one or more of the candidate functions that are determined to be acceptable functions, according to the matching data, for respective data fields of the new and/or updated form.

Electronic document preparation system 111 can request input from the expert to approve at least one of the acceptable candidate functions. Additionally, or alternatively, the electronic document preparation system 111 can automatically determine that the candidate function is acceptable, based on the matching data, and update electronic document preparation system 111 without review or approval. In this way, the electronic document preparation system can automatically learn and incorporate new or revised data fields and forms into electronic document preparation system 111.

Electronic document preparation system 111 includes interface module 112, machine learning module 113, data acquisition module 114, natural language parsing module 115, historical form analysis module 116, and user document preparation engine 117, according to one embodiment.

Interface module 112 is configured to receive form data 119 related to a new and/or updated form. Interface module 112 can receive the form data 119 from an expert, from a government agency, from a financial institution, or in other ways now known or later developed.

According to one embodiment, when a new and/or updated form is made available, an expert, other personnel, or other human or nonhuman resources of electronic document preparation system 111 can upload or otherwise provide an electronic version of the form to interface module 112. Interface module 112 can also receive the form data in an automated manner such as by receiving automatic updates or in another way. The electronic version of the form is represented by form data 119. Form data 119 can include a PDF document, an HTML document, an accessible PDF document, or other types of electronic document formats. The form data can include data related to data fields of the received form, limiting values, tables, or other data related to the new and/or updated form and its data fields that are used in the machine learning process.

Interface module 112 can also output results data 120 indicating the results of a machine learning process for particular candidate functions. The interface module 112 can also output learned form data 121 related to finalized learned functions, i.e. those functions that have been determined by processes discussed herein and which have been determined to be acceptable within a predetermined margin of error.

An expert can obtain and review the results data 120 and the learned form data 121 from the interface module 112. Results data 120 or other test data can also be utilized by an expert and/or an automated system to use for other purposes. For example: results data 120 or other test data can be used by electronic document preparation systems to test software instructions of the electronic document preparation system before making functionality associated with the software instructions available to the public.

The machine learning module 113 analyzes the form data 119 in order to learn functions for the data fields of the new and/or updated form and incorporate them into the electronic document preparation system 111. The machine learning module 113 generates the results data 120 and the learned form data 121.

In one embodiment, the machine learning module 113 is able to generate and test thousands of candidate functions very rapidly in successive iterations. The machine learning module 113 can utilize one or more algorithms to generate candidate functions based on many factors.

For example, machine learning module 113 can generate new candidate functions based on previously tested candidate functions.

In one embodiment, in a system where many candidate functions are generated and tested, components of a predetermined number of candidate functions that match the training data better than other candidate functions are used to generate new candidate functions which are then tested. In one embodiment, a component of a new candidate function includes one or more operators of the candidate function. In one embodiment, a component of a new candidate function includes one or more constants of the candidate function. In one embodiment, a component of a new candidate function includes one or more dependencies used to generate the candidate function.

In one embodiment, one or more of the predetermined number of candidate functions that match the training data better than other candidate functions are split into two or more components each, and the split components recombined into new candidate functions that are then tested to determine how well test data generated from those new candidate functions match the training set data. One or more of those new candidate functions that are determined to generate test data that match the training set data better than the original candidate functions may then again be split, if desired, and recombined into a second set of new candidate functions, and so on, until the resulting candidate functions produce test data that are deemed to match the training set data within a predetermined margin of error, as discussed herein. Thus, machine learning module 113 learns the components of the best functions and uses those components to quickly iterate towards an optimum solution. The machine learning module 113 can utilize analysis of the form data and/or other data to learn the best components of the candidate functions for a particular data field and can generate candidate functions based on these best components.

In one embodiment, the electronic document preparation system 111 uses data acquisition module 114 to acquire training set data 122. Training set data 122 includes, in various embodiments, previously prepared documents for one or more previous users of the electronic document preparation system 111 and/or fictitious users of the electronic document preparation system 111. The training set data 122 can be used by the machine learning module 113 in order to learn and incorporate the new and/or updated form into the electronic document preparation system 111.

In one embodiment, training set data 122 includes historical data 123 related to previously prepared documents or previously filed forms of one or more users. The historical data 123 can include, for each of a number of previous users of the electronic document preparation system 111, a respective completed or partially completed copy of the new and/or updated form or a completed or partially completed copy of a form related to the new and/or updated form. The copies of the form include data values in at least the data fields for which one or more functions are to be determined.

In one embodiment, the training set data 122 includes fabricated data 124. The fabricated data 124 can include copies of the new and/or updated form that were previously filled using fabricated data. The fabricated data can include real data from previous users or other people but that has been scrubbed of personal identifiers or otherwise altered. Further, the fabricated data can include data that matches the requirements of each data field, but which may not have been used in a filing of a formal document with the authorities, such as with the Internal Revenue Service.

In one embodiment, the historical data 123 and/or the fabricated data 124 also includes related data used to complete the forms and to prepare the historical document, such as one or more worksheets or other subcomponents that are used to determine data values of one or more data fields of the training set data. The historical data 123 can include previously prepared documents that include or use completed form data which were filed with and/or approved by a government or other institution. In this way, a large portion of historical data 123 is likely highly accurate and properly prepared, though some of the previously prepared documents will inevitably include errors. Typically, the functions for computing or obtaining the proper data entry for a data field of a form can include data values from other forms related to each other and sometimes complex ways. Thus, the historical data 123 can include, for each historical user in the training set data, a final version of a previously prepared document, the form that is related to the new and/or updated form to be learned, other forms used to calculate the values for the related form, and other sources of data for completing the related form.

In one embodiment, the electronic document preparation system 111 is a financial document preparation system. In this case, the historical data 123 includes historical financial data. The historical financial data can include, for one or more historical users of the electronic document preparation system 111, data representing one or more items associated with various users, i.e. the subjects of the electronic forms, such as, but not limited to, one or more of a name of the user, a name of the user's employer, an employer identification number (EID), a job title, annual income, salary and wages, bonuses, a Social Security number, a government identification, a driver's license number, a date of birth, an address, a zip code, home ownership status, marital status, W-2 income, an employer's address, spousal information, children's information, asset information, medical history, occupation, information regarding dependents, salary and wages, interest income, dividend income, business income, farm income, capital gain income, pension income, IRA distributions, education expenses, health savings account deductions, moving expenses, IRA deductions, student loan interest, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, item name and description, item purchase cost, date of purchase, and any other information that is currently used, that can be used, or that are used in the future, in a financial document preparation system or in the preparation of financial documents such as a user's tax return, according to various embodiments.

In one embodiment, the data acquisition module 114 is configured to obtain or retrieve historical data 123 from one or more sources, including a large number of sources, e.g. 100 or more. The data acquisition module 114 can retrieve, from databases of the electronic document preparation system 111, historical data 123 that has been previously obtained by the electronic document preparation system 111 from third-party institutions. Additionally, or alternatively, the data acquisition module 114 can retrieve the historical data 123 afresh from the third-party institutions.

In one embodiment, data acquisition module 114 can also supply or supplement historical data 123 by gathering pertinent data from other sources including third party computing environment 150, public information computing environment 160, additional service provider systems 135, data provided from historical users, data collected from user devices or accounts of electronic document preparation system 111, social media accounts, and/or various other sources to merge with or supplement historical data 123, according to various embodiments.

Data acquisition module 114 can gather additional data including historical financial data and third party data. For example, data acquisition module 114 is configured to communicate with additional service provider systems 135, e.g., a tax return preparation system, a payroll management system, or other electronic document preparation system, to access financial data 136, according to one embodiment. Data acquisition module 114 imports relevant portions of the financial data 136 into the electronic document preparation system 111 and, for example, saves local copies into one or more databases, according to one embodiment.

In one embodiment, the additional service provider systems 135 include a personal electronic document preparation system, and the data acquisition module 114 is configured to acquire financial data 136 for use by the electronic document preparation system 111 in learning and incorporating the new or updated form into the electronic document preparation system 111. Because the service provider provides both the electronic document preparation system 111 and, for example, the additional service provider systems 135, the service provider computing environment 110 can be configured to share financial information between the various systems. By interfacing with the additional service provider systems 135, the data acquisition module 114 can automatically and periodically supply or supplement the historical data 123 from the financial data 136. The financial data 136 can include income data, investment data, property ownership data, retirement account data, age data, data regarding additional sources of income, marital status, number and ages of children or other dependents, geographic location, and other data that indicates personal and financial characteristics of users of other financial systems, according to one embodiment.

The data acquisition module 114 is configured to acquire additional information from various sources to merge with or supplement training set data 122, according to one embodiment. For example, the data acquisition module 114 is configured to gather historical data 123 from various sources. For example, the data acquisition module 114 is configured to communicate with additional service provider systems 135, e.g., a tax return preparation system, a payroll management system, or other financial management system, to access financial data 136, according to one embodiment. The data acquisition module 114 imports relevant portions of the financial data 136 into the training set data 122 and, for example, saves local copies into one or more databases, according to one embodiment.

The data acquisition module 114 is configured to acquire additional financial data from the public information computing environment 160, according to one embodiment. The training set data can be gathered from public record searches of tax records, public information databases, property ownership records, and other public sources of information. The data acquisition module 114 can also acquire data from sources such as social media websites, such as Twitter, Facebook, LinkedIn, and the like.

The data acquisition module 114 is configured to acquire data from third parties, according to one embodiment. For example, the data acquisition module 114 requests and receives third party data from the third party computing environment 150 to supply or supplement the training set data 122, according to one embodiment. In one embodiment, the third party computing environment 150 is configured to automatically transmit financial data to the electronic document preparation system 111 (e.g., to the data acquisition module 114), to be merged into training set data 122. The third party computing environment 150 can include, but is not limited to, financial service providers, state institutions, federal institutions, private employers, financial institutions, social media, and any other business, organization, or association that has maintained financial data, that currently maintains financial data, or which may in the future maintain financial data, according to one embodiment.

In one embodiment, the electronic document preparation system 111 utilizes the machine learning module 113 to learn the data fields of the new and/or updated form in conjunction with training set data 122. The machine learning module 113 generates candidate functions for one or more data fields of the new and/or updated form to be learned and applies the candidate functions to the training set data 122 in order to find an acceptable candidate function that produces data values that match or closely match data values of the corresponding data fields of the training set data 122.

In one embodiment, in a system wherein many candidate functions are generated and tested, components of a predetermined number of candidate functions that match the training data better than other candidate functions are used to generate new candidate functions which are then tested. In one embodiment, a component of a new candidate function includes one or more operators of the candidate function. In one embodiment, a component of a new candidate function includes one or more constants of the candidate function. In one embodiment, a component of a new candidate function includes one or more dependencies used to generate the candidate function.

In one embodiment, one or more of the predetermined number of candidate functions that match the training data better than other candidate functions are split into two or more components each, and the split components recombined into new candidate functions that are then tested to determine how well test data generated from those new candidate functions match the training set data. One or more of those new candidate functions that are determined to generate test data that match the training set data better than the original candidate functions may then again be split, if desired, and recombined into a second set of new candidate functions, and so on, until the resulting candidate functions produce test data that are deemed to match the training set data within a predetermined margin of error, as discussed herein. Thus, machine learning module 113 learns the components of the best functions and uses those components to quickly iterate towards an optimum solution.

In one embodiment, the electronic document preparation system 111 identifies dependency data 129 including one or more possible dependencies for one or more data fields to be learned. These possible dependencies can include one or more data values from other data fields of the new and/or updated form, one or more data values from another related form or worksheet, one or more constants, or many other kinds of possible dependencies that can be included in an acceptable function for a particular data field.

In one embodiment, the machine learning module 113 generates candidate functions based on the dependency data 129 and one or more operators selected from a set of operators. The operators can include arithmetic operators such as addition, subtraction, multiplication, or division operators; logical operators such as if-then operators; existence condition operators that depend on the existence of a data value in another data field of new and/or updated form, in a form other than the new and/or updated form, or in some other location or data set; and string comparisons including greater than, less than and equal to, among others. Each candidate function can include one or more of the operators operating on one or more of the possible dependencies.

In one embodiment, the machine learning module 113 learns acceptable functions for various data fields of a given form one at a time. In other words, if the form data 119 indicates that a form has ten data fields to be learned, the machine learning module 113 will begin by learning an acceptable function for a first data field of the new and/or updated form before learning acceptable functions for other data fields of the same form. In particular, the machine learning module 113 will generate candidate function data 125 corresponding to one or more candidate functions for the first data field of the new and/or updated form as represented by the form data 119.

The machine learning module 113 also receives training set data 122 from the data acquisition module 114. The training set data 122 includes data related to previously completed copies of an older version of the form to be learned or previously completed copies of a form closely related to the new and/or updated form to be learned. In particular, the training set data 122 includes copies of the form that have a data entry in the data field that corresponds to the data field of the new and/or updated form currently being analyzed and learned by the machine learning module 113. The training set data 122 also includes data that was used to calculate the data values in the data field for each copy of the form or for each copy of the related form, e.g. W-2 data, income data, data related to other forms such as tax forms, payroll data, personal information, or any other kind of information that was used to complete the copies of the form or the copies of the related form in the training set data 122. The machine learning module 113 generates test data 126 by applying each of the candidate functions to the training set data for the particular data field currently being learned. In particular, for each copy of the form or related form in the training set data 122, the machine learning module 113 applies the candidate function to at least a portion of the training set data related to the data field being learned in order to generate a test data value for the data field. Thus, if the training set data 122 includes 1000 completed copies of the new and/or updated form or a related form, then machine learning module 113 will generate test data 126 that includes one test data value for the particular data field being analyzed for at least a portion of the thousand completed copies.

In one embodiment, the machine learning module 113 then generates matching data 127 by comparing the test data value for each copy of the form to the actual data value from the completed data field of that copy of the form. The matching data 127 indicates how many of the test data values match their corresponding completed data value from the training set data 122 within a predetermined margin of error.

In one embodiment, a fitness function is used to determine that one or more candidate functions are acceptable. In one embodiment, the fitness function includes an error function, such as a root mean square error function, reflecting errors that may be present in test data associated with one or more data sets of the training set data, as discussed herein. Other error functions currently known to those of ordinary skill or later developed may be used without departing from the scope of this disclosure. Other components of a fitness function include, according to various embodiments, one or more of how many operators are present in the candidate function, how many operators depend on results of other operators completing prior operations, whether there are missing arguments in the candidate function, and whether an argument is repeated in the candidate function. The tax return preparation system then generates results data indicating whether the candidate function is acceptable and/or a fitness score, determined using a fitness function or an error function, or both, which may be used in a determination of a level of fitness, or a determination of a level of acceptability, for example.

As explained above, in a system wherein many candidate functions are generated and tested, components of a predetermined number of candidate functions that match the training data better than other candidate functions are used to generate new candidate functions which are then tested. In one embodiment, a component of a new candidate function includes one or more operators of the candidate function. In one embodiment, a component of a new candidate function includes one or more constants of the candidate function. In one embodiment, a component of a new candidate function includes one or more dependencies used to generate the candidate function.

In one embodiment, one or more of the predetermined number of candidate functions that match the training data better than other candidate functions are split into two or more components each, and the split components recombined into new candidate functions that are then tested to determine how well test data generated from those new candidate functions match the training set data. One or more of those new candidate functions that are determined to generate test data that match the training set data better than the original candidate functions may then again be split, if desired, and recombined into a second set of new candidate functions, and so on, until the resulting candidate functions produce test data that are deemed to match the training set data within a predetermined margin of error, as discussed herein. Thus, machine learning module 113 learns the components of the best functions and uses those components to quickly iterate towards an optimum solution.

It is expected that the training set data 122 may include some errors in the completed data values for the data field under test. Thus, an acceptable function operating on the test data may result in test data 126 that does not perfectly match the completed data fields in the training set data 122. Thus, an acceptable candidate function will at least result in test data that matches the training set data within a predefined margin of error.

In one embodiment, a fitness function is used to determine that one or more candidate functions are acceptable. In one embodiment, the fitness function includes an error function, such as a root mean square error function, reflecting errors that may be present in test data associated with one or more data sets of the training set data, as discussed herein. Other error functions currently known to those of ordinary skill or later developed may be used without departing from the scope of this disclosure. Other components of a fitness function include, according to various embodiments, one or more of how many operators are present in the candidate function, how many operators depend on results of other operators completing prior operations, whether there are missing arguments in the candidate function, and whether an argument is repeated in the candidate function. The tax return preparation system then generates results data indicating whether the candidate function is acceptable and/or a fitness score, determined using a fitness function or an error function, or both, which may be used in a determination of a level of fitness, or a determination of a level of acceptability, for example.

In one embodiment, as discussed herein, the machine learning module 113 will continue to generate and test candidate functions until a candidate function has been found that results in test data that matches the training set data 122 within the predefined margin of error. When at least one acceptable function has been found for the first data field, the machine learning module 113 can repeat this process for a second data field, and so on, for each data field of the new and/or updated form to be learned.

In one embodiment, the machine learning module 113 generates and tests candidate functions one at a time. Each time the matching data 127 for a candidate function does indicates an error that exceeds the predefined margin of error, i.e. that the candidate function is not acceptable, the machine learning module 113 may generate a new candidate function and tests the new candidate function.

In one embodiment, to form one or more new candidate functions, components of a predetermined number of previously formed candidate functions that match the training data better than other candidate functions, but perhaps not enough to be determined acceptable functions, are used to generate new candidate functions which are then tested. In one embodiment, a component of a new candidate function includes one or more operators of the previously formed candidate function. In one embodiment, a component of a new candidate function includes one or more constants of the previously formed candidate function. In one embodiment, a component of a new candidate function includes one or more dependencies used to generate the previously formed candidate function.

In one embodiment, one or more of the predetermined number of candidate functions that match the training data better than other candidate functions are split into two or more components each, and the split components recombined into new candidate functions that are then tested to determine how well test data generated from those new candidate functions match the training set data. One or more of those new candidate functions that are determined to generate test data that match the training set data better than the original candidate functions may then again be split, if desired, and recombined into a second set of new candidate functions, and so on, until one or more resulting candidate functions produce test data that are deemed to match the training set data within a predetermined margin of error, as discussed herein. Thus, machine learning module 113 learns the components of the best functions and uses those components to quickly iterate towards an optimum solution.

The machine learning module 113 can continue this process until an acceptable candidate function has been found. In this way, the machine learning module 113 generates one or more acceptable candidate functions sequentially for each data field under test.

In one embodiment, the machine learning module 113 can first generate candidate functions and then test each of the generated candidate functions. If the matching data 127 indicates that none of the generated candidate functions is an acceptable candidate function, then the machine learning module 113 can generate additional candidate functions and apply them to the training set data 122. The machine learning module 113 can continue generating candidate functions and applying them to the training set data until an acceptable function has been found.

In one embodiment, the machine learning module 113 generates candidate functions in successive iterations based on one or more algorithms. The successive iterations can be based on whether the matching data indicates that the candidate functions are becoming more accurate, such as in the successive iteration algorithm discussed herein where previously tested candidate functions are split into two or more components and recombined into new candidate functions. The machine learning module 113 can continue to make adjustments to the candidate functions in directions that make the matching data more accurate until at least one acceptable function has been found.

In one embodiment, the machine learning module 113 generates confidence score data 128 based on the matching data 127. The confidence score data 128 can be based on the matching data 127 and data regarding the candidate function itself. For example, the confidence score is adjusted downward, indicating that a less desirable candidate function has been found, if the candidate function uses an operator twice. The confidence score may further be adjusted downward, indicating that a less desirable candidate function has been found, for longer candidate functions, i.e. those functions having more operators. The confidence score may further be adjusted downward or upward based on how quickly a candidate function performs in its entirety. Other such adjustments may be used without departing from the teachings presented herein.

In one embodiment, the machine learning module 113 generates results data 120. The results data 120 can include matching data 127 and/or confidence score data 128 for each candidate function that has been tested for one or more particular data fields of the new and/or updated form to be learned. Alternatively, the results data 120 can include data indicating that one or more of the candidate functions is possibly acceptable based on the matching data 127 and/or the confidence score 128. Alternatively, the results data 120 can indicate that at least one acceptable function has been found. The results data 120 can also indicate what the acceptable function is. Results data 120 can be provided to the interface module 112. The interface module 112 can output the results data 120 to a user, an expert, or other personnel for review and/or approval.

In one embodiment, the machine learning module 113 outputs results data 120 indicating that a candidate function has been determined that is likely acceptable. The results data 120 can indicate what the determined candidate function is, the matching data 127 or confidence score data 128 related to the determined candidate function, or any other information that will be useful for review by an expert. The machine learning module 113 can cause the interface module 112 to prompt expert user or other individual to review the results data 120 and to approve the determined candidate function as acceptable or to indicate that the determined candidate function is not acceptable and that the machine learning module 113 should continue generating candidate functions for the data field currently under consideration. The machine learning module 113 awaits input from the expert or other personnel approving the candidate function. If the candidate function is approved by the expert or other personnel, the machine learning module 113 determines that the acceptable candidate function has been found and moves on to finding an acceptable candidate function for a next data field of the new and/or updated form.

In one embodiment, the machine learning module 113 does not wait for the approval of an expert before determining that an acceptable candidate function was found. Instead, when the machine learning module 113 determines that an acceptable candidate function has been found based on the matching data, the confidence score data 128, and/or other criteria, the machine learning module 113 incorporates the acceptable candidate function and moves onto another data field of the new and/or updated form.

In one embodiment, when the machine learning module 113 has learned an acceptable candidate function for data fields of the new and/or updated form that needed to be learned, then the machine learning module 113 generates learned form data 121. The learned form data 121 indicates that the new and/or updated form has been learned. The learned form data 121 can also indicate what the acceptable candidate functions are for one or more of the data fields of the new and/or updated form. The interface module 112 can output the learned form data 121 for review and/or approval by a user or expert. In one embodiment, once the user, expert or other personnel has approved the learned form data 121, the machine learning module 113 ceases analysis of the new and/or updated form and awaits form data 119 related to another form to be learned.

In one embodiment, the electronic document preparation system 111 includes a user document preparation engine 117. The user document preparation engine 117 assists users of the electronic document preparation system 111 to prepare a financial document based on or including the newly learned form as well as other forms. The user document preparation engine 117 includes current document instructions data 131. The current document instructions data 131 includes software instructions, modules, engines, or other data or processes used to assist users of the electronic document preparation system 111 in electronically preparing a document.

In one embodiment, once the machine learning module 113 has fully learned one or more acceptable candidate functions for the data fields of a new and/or updated form, the machine learning module 113 incorporates the newly learned form into the electronic document preparation system 111 by updating the current document instructions data 131. When the current document instructions data 131 has been updated to include and recognize the new and/or updated form, then users of the electronic document preparation system can electronically complete the new and/or updated form using electronic document preparation system 111. In this way, the electronic document preparation system 111 quickly provides functionality that electronically complete the data fields of the new and/or updated form as part of preparing a financial document.

In one embodiment, the user computing environment 140 is a computing environment related to a user of the electronic document preparation system 111. The user computing environment 140 includes input devices 141 and output devices 142 for communicating with the user, according one embodiment. The input devices 141 include, but are not limited to, keyboards, mice, microphones, touchpads, touchscreens, digital pens, and the like. The output devices 142 include, but are not limited to, speakers, monitors, touchscreens, and the like. The output devices 142 can display data related to the preparation of the financial document.

In one embodiment, the machine learning module 113 can also generate interview content to assist in a financial document preparation interview. As a user utilizes the electronic document preparation system 111 to prepare a financial document, the user document preparation engine 117 may guide the user through a financial document preparation interview in order to assist the user in preparing the financial document. The interview content can include graphics, prompts, text, sound, or other electronic, visual, or audio content that assists the user to prepare the financial document. The interview content can prompt the user to provide data, to select relevant forms to be completed as part of the financial document preparation process, to explore financial topics, or otherwise assist the user in preparing the financial document. When the machine learning module 113 learns acceptable functions for one or more data fields of a form, the machine learning module 113 can also generate text or other types of audio or video prompts that describe the function and that can prompt the user to provide information that the user document preparation engine 117 will use to complete the form. Thus, the machine learning module 113 can generate interview content to assist in a financial document preparation interview.

In one embodiment, the machine learning module 113 updates the current document instruction data 131 once a new and/or updated form has been entirely learned without input or approval of an expert or other personnel. In one embodiment, the machine learning module 113 updates the current document instructions data 131 only after an expert has given approval that the new and/or updated form has properly learned.

In one embodiment, the machine learning module 113 only learns acceptable functions for selected fields of a new and/or updated form. For example, the machine learning module 113 is configured to perform machine learning processes to learn acceptable functions for certain types of data fields. Some types of data fields may not be as conducive to machine learning processes or for other reasons the machine learning module 113 is configured to learn acceptable functions for only particular data fields of a new and/or updated form. In these cases, the machine learning module 113 will only learn acceptable functions for certain selected data fields of the new and/or updated form. In some cases, the machine learning module 113 may determine that it is unable to learn an acceptable function for one or more data fields after generating and testing many candidate functions for the one or more data fields. The results data 120 can therefore include data indicating that an acceptable function for a particular data field of the new and/or updated form cannot be learned by the machine learning module 113.

In one embodiment, once the form data 119 has been provided to the electronic document preparation system 111, a user, expert or other personnel can input an indication of which data fields of the new and/or updated form should be learned by the machine learning module 113. The machine learning module 113 will then only learn acceptable functions for those fields of the new and/or updated form that have been indicated by the user, expert or other personnel. In one embodiment, the form data 119 can indicate which data fields the machine learning module 113 should consider. In this way, the machine learning module 113 only attempts to learn acceptable functions for the indicated data fields of a new and/or updated form.

In one embodiment, an acceptable function for a data field is simple or complex. A complex function may require that multiple data values be gathered from multiple places within other forms, the same form, from a user, or from other locations or databases. A complex function may also include mathematical relationships that will be applied to the multiple data values in complex ways in order to generate the proper data value for the data field. A function may include finding the minimum data value among two or more data values, finding the maximum data value among two or more data values, addition, subtraction, multiplication, division, exponential functions, logic functions, existence conditions, string comparisons, etc. The machine learning module 113 can generate and test complex candidate functions until an acceptable function has been found for a particular data field.

In one embodiment, new and/or updated forms may include data fields that expect data values that are alphabetical such as a first name, a last name, a middle name, a middle initial, a company name, a name of a spouse, a name of a child, a name of a dependent, a home address, a business address, a state of residence, the country of citizenship, or other types of data values that are generally alphabetic. In these cases, An acceptable function may include a person, a last name, a middle name, a middle initial, a company name, a name of a spouse, a name of a child, a name of a defendant, a home address, a business address, a state residence, the country citizenship, or other types of alphabetic data values. An acceptable function can also include a location from which these alphabetic data values are retrieved in other forms, worksheets, or financial related data otherwise provided by users or gathered from various sources.

The forms may also include data fields that expect data values that are numeric by nature. These expected data values may include incomes, tax withholdings, Social Security numbers, identification numbers, ages, loan payments, interest payments, charitable contributions, mortgage payments, dates, or other types of data values that are typically numeric in nature.

In one embodiment, the machine learning module 113 can generate candidate functions for a particular data field based on dependency data that can provide an indication of the types of data that are likely to be included in an acceptable function and their likely location in other forms or data. For example, the machine learning module 113 can utilize historical document instructions data 130, natural language parsing data 118, current document instructions data 131, and other types of contextual clues or hints in order to find a likely starting place for generating candidate functions. For this reason, the electronic document preparation system 111 can include a natural language parsing module 115 and the historical form analysis module 116.

In one embodiment, the natural language parsing module 115 analyzes the form data 119 with a natural language parsing process. In particular, the natural language parsing module analyzes the text description associated with data fields of the new and/or updated form to be learned. For example, the form data 119 may include text descriptions for various data fields of the new and/or updated form. The natural language parsing module 115 analyzes these text descriptions and generates natural language parsing data 118 indicating the type of data value expected in each data field based on the text description. The natural language parsing module 115 provides the natural parsing data 118 to the machine learning module 113. The machine learning module 113 generates candidate functions for the various data fields based on the natural language parsing data 118. In this way, the machine learning module 113 utilizes the natural language parsing data 118 to assist in the machine learning process.

In one embodiment, the historical form analysis module 116 analyzes the form data 119 in order to determine if it is likely that previous versions of the electronic document preparation system 111 included software instructions that computed data values for data fields of historical forms that are similar to the new and/or updated form. Accordingly, the historical form analysis module 116 analyzes the historical document instructions data 130 that includes software instructions from previous versions of the electronic document preparation system 111. Because it is possible that the previous versions of the electronic document preparation system utilized software languages or structures that are now obsolete, the historical document instructions data 130 cannot easily or simply be analyzed or imported into the current document instructions data 131. For this reason, the historical form analysis module 116 can analyze the historical document instructions data 130 related to historical forms that are similar to the new and/or updated form. Such historical forms may include previous versions of the new and/or updated form. The historical form analysis module 116 can identify from the outdated software language portions of or complete acceptable functions related to data fields of the historical forms and can generate historical instruction analysis data that indicates portions of or complete acceptable functions for the previous version of the form. The machine learning module 113 can utilize these instructions in order to find a starting point for generating the candidate functions in order to learn functions of data fields of the new and/or updated form.

In some cases, a new and/or updated form is nearly identical to a previous known version of the form. In these cases, the training set data 122 can include historical data 123 that relates to previously prepared, filed, and/or approved financial documents that included or based on the previous known form. In these cases, the data acquisition module 114 will gather a training set data 122 that includes one or more previously completed copies of the previous version of the form. The machine learning module 113 generates the candidate functions and applies them to the training set data as described previously.

In some cases, a new and/or updated form may include data fields that are different enough that no analogous previously prepared financial documents are available to assist in the machine learning process. In one embodiment, the data acquisition module 114 gathers training set data 122 that includes fabricated financial data 124. The fabricated financial data 124 can include copies of the new and/or updated form prepared with fabricated financial data by a third-party organization or a processor system associated with the service provider computing environment 110. The fabricated financial data 124 can be used by the machine learning module 113 in the machine learning process for learning acceptable functions associated with the data fields of the new and/or updated form. In such a case, the machine learning module 113 generates candidate functions and applies them to the training set data 122 including the fabricated financial data 124 as described previously.

In one embodiment, the training set data 122 can include both historical data 123 and fabricated financial data 124. In some cases, the historical data 123 can include previously prepared documents as well as previously fabricated financial documents based on fictitious or real financial data.

In one embodiment, the data acquisition module 114 gathers new training set data 122 each time a new data field of the new and/or updated form is to be analyzed by the machine learning module 113. The data acquisition module 114 can gather a large training set data 122 including many thousands or millions of previously prepared or previously fabricated financial documents. When a new data field of a new and/or updated form is to be learned by the machine learning module 113, the data acquisition module 114 will gather training set data 122, or subset of the training set data 122, that includes a number of previously prepared financial documents that each have a data value in a data field of a form that corresponds to the data field of the new and/or updated form that is currently being learned by the machine learning module 113. In some cases, the training set data 122 can include millions of previously prepared financial documents, only a few hundred or thousands of the previously prepared documents are typically needed for analysis by the machine learning module 113. Thus, the data acquisition module 114 can gather training set data that is appropriate and efficient for the machine learning module 113 to use the learning the current data field of the new and/or updated form.

In one embodiment, the electronic document preparation system 111 is a tax return preparation system. Preparing a single tax return can require many government tax forms, internal worksheets used by the tax return preparation system in preparing a tax return, W-2 forms, and many other types of forms or financial data pertinent to the preparation of a tax return preparation system. For each tax return that is prepared for a user, the tax return preparation system maintains copies of various tax forms, internal worksheets, data provided by the user and any other relevant financial data used to prepare the tax return. Thus, the tax return preparation system typically maintains historical tax return data related to a large number of previously prepared tax returns. The tax return preparation system can utilize the historical tax return data to gather or generate relevant training set data 122 that can be used by the machine learning module 113.

In one embodiment, a state or federal agency releases a new tax form that is simply a new version of a previous tax form during tax return preparation season. The form data 119 corresponds to an electronic version of the new version of the tax form. One or more of the data fields of the new tax form is similar to those of the previous tax form. The machine learning module 113 begins to learn the new tax form starting with a first selected data field of the new tax form. The first selected data field corresponds to a first selected line of the new tax form, not necessarily line 1 of the new tax form. The machine learning module 113 causes the data acquisition module 114 to gather training set data 122 that includes a number of previously prepared tax returns and tax related data associated with the previously prepared tax returns. In particular, training set data 122 will include previously prepared tax returns that use the previous version of the new and/or updated form. The machine learning module 113 generates a plurality of candidate functions for the first selected data field and applies them to the training set data 122. For each candidate function, the machine learning module 113 generates matching data 127 and/or confidence score data 128 indicating how well the test data 126 matches the training set data 122. The machine learning module 113 generates results data 120 indicating the matching data 127 and/or the confidence score data 128 of one or more of the candidate functions. The results data 120 can also indicate whether a candidate function is deemed to be an acceptable function for the first selected data field. If candidate functions have been tested and have not been deemed acceptable, additional new candidate functions are formed, with one or more of those new candidate functions being formed from components of one or more of the previous candidate functions.

In one embodiment, to form one or more new candidate functions, components of a predetermined number of previously formed candidate functions that match the training data better than other candidate functions, but perhaps not enough to be determined acceptable functions, are used to generate new candidate functions which are then tested. In one embodiment, a component of a new candidate function includes one or more operators of the previously formed candidate function. In one embodiment, a component of a new candidate function includes one or more constants of the previously formed candidate function. In one embodiment, a component of a new candidate function includes one or more dependencies used to generate the previously formed candidate function.

In one embodiment, one or more of the predetermined number of candidate functions that match the training data better than other candidate functions are split into two or more components each, and the split components recombined into new candidate functions that are then tested to determine how well test data generated from those new candidate functions match the training set data. One or more of those new candidate functions that are determined to generate test data that match the training set data better than the original candidate functions may then again be split, if desired, and recombined into a second set of new candidate functions, and so on, until one or more resulting candidate functions produce test data that are deemed to match the training set data within a predetermined margin of error, as discussed herein. Thus, machine learning module 113 learns the components of the best functions and uses those components to quickly iterate towards an optimum solution.

The machine learning module 113 moves onto a second selected data field after an acceptable function has been found for the first selected data field. In one embodiment, the data fields correspond to selected lines of the new tax form. The machine learning module 113 continues in this manner until functions relating to all selected data fields of the new tax form have been learned. Machine learning module 113 then generates learned form data 121 indicating that all selected fields of the new and/or updated form have been learned. The interface module 112 can present results data 120 or learned form data 121 for review and/or approval by an expert or other personnel. Alternatively, the machine learning module 113 can move from one data field to the next data field without approval or review by an expert, as explained herein.

In one embodiment, the tax return preparation system receives form data 119 corresponding to a new and/or updated form for which an adequate previously known form cannot be found. In this case, data acquisition module 114 gathers training set data that can include fabricated financial data 124. The fabricated financial data 124 can include fictitious previously prepared tax returns and fabricated financial data that was used to prepare them. The data acquisition module 114 can obtain the fabricated financial data 124 from one or more third parties, one or more associated tax return preparation systems, or in any other way. For example, the tax return preparation system can generate fabricated financial data and provide it to one or more third parties to prepare a fabricated tax return using the new tax form. The fabricated financial data can include data related to real users of the tax return preparation system, a script of actual identifiers such as real names, real Social Security numbers, etc. The third parties can then prepare tax returns from the fabricated financial data using the new and/or updated form. The third parties can then provide the fabricated tax returns to the tax return preparation system. The tax return preparation system can then utilize the fabricated financial data 124 in conjunction with the machine learning module 113 to learn the functions for the data fields of the new and/or updated form.

In one specific illustrative example, the tax return preparation system receives form data 119 related to a new tax form. The data acquisition module 114 gathers training set data 122 that at least includes historical tax return data related to previously prepared tax returns and or fabricated historical tax return data related to fabricated tax returns using the new form. In this example, machine learning module 113 undertakes to learn an acceptable function for generating the data value required by line 3 of the new tax form. The machine learning module 113 uses at least a portion of the dependency data that indicates that an acceptable function for line 3 is likely based on the values of line 31, line 2c, and the constants 3000 and 6000.

The training set data 122 includes previously completed copies of the new form or a related form having data values for line 3 that are believed to be correct. The training set data 122 also includes, in one embodiment, tax related data that were used to prepare the previously completed copies.

The machine learning module 113 generates at least one candidate function for line 3 of the new form and applies the candidate function(s) to the training set data 122. In particular, the machine learning module 113 generates test values of test data 126 by at least substituting at least a portion of the training set data for one or more of lines 31, 2c and the two constants, 3000 and 6000 in the candidate function for each subset of training set data for one or more of the previously completed copies, resulting in test values for line 3 of previously completed copies of the new or related form. The machine learning module 113 generates matching data by comparing the resulting test values to the actual completed data values for line 3 from the training set data 122. The matching data 127 indicates how well the various test values match the actual values in line 3 of the previously completed forms. Thus, the comparison may include determining a margin of error relating to how well the test values match the actual values, or may include a straight comparison, such as subtracting one value from the other, or may include a more complex comparison, as desired by an implementer of the process operations discussed herein.

In one embodiment, a fitness function is used to determine that one or more candidate functions are acceptable. In one embodiment, the fitness function includes an error function, such as a root mean square error function, reflecting errors that may be present in test data associated with one or more data sets of the training set data, as discussed herein. Other error functions currently known to those of ordinary skill or later developed may be used without departing from the scope of this disclosure. Other components of a fitness function include, according to various embodiments, one or more of how many operators are present in the candidate function, how many operators depend on results of other operators completing prior operations, whether there are missing arguments in the candidate function, and whether an argument is repeated in the candidate function. The tax return preparation system then generates results data indicating whether the candidate function is acceptable and/or a fitness score, determined using a fitness function or an error function, or both, which may be used in a determination of a level of fitness, or a determination of a level of acceptability, for example.

If the matching data 127 indicates that at least portions of test data 126 matches the training set data 122 within a predefined margin of error, then the machine learning module 113 determines that the candidate function is acceptable. In the example, after one or more iterations of generating and testing candidate functions, the machine learning module 113 may conclude that an acceptable function for line 3 is that if line 31 exists, then line 3 will be equal to line 31. Alternatively, if line 31 does not exist, then line 3 is the minimum of 6000 or 3000 multiplied by the value from line 2c.

In one embodiment, machine learning module 113 can also generate confidence score data 128 indicating a level of confidence that the candidate function is acceptable. Machine learning module 113 generates results data 120 that indicate that the candidate function is likely an acceptable function. Interface module 112 outputs results data 120 for review and/or approval by expert, other personnel, or other human and/or nonhuman resources. The expert or other personnel can approve the candidate function, causing machine learning module 113 to move to the next selected line of the new tax form. Alternatively, machine learning module 113 can decide that the candidate function is acceptable without approval from an expert or other personnel and can move onto the next selected line of the new tax form.

If the matching data 127 indicates that the candidate function does not match the training set data well enough, then the machine learning module 113 generates one or more other candidate functions and generates test data 126 by applying the one or more candidate functions to the training set data 122 as described above.

In one embodiment, to form one or more new candidate functions, components of previously formed candidate functions that match the training data better than other candidate functions, but perhaps not enough to be determined acceptable functions, are used to generate new candidate functions which are then tested. In one embodiment, a component of a new candidate function includes one or more operators of the previously formed candidate function. In one embodiment, a component of a new candidate function includes one or more constants of the previously formed candidate function. In one embodiment, a component of a new candidate function includes one or more dependencies used to generate the previously formed candidate function.

In one embodiment, one or more of the predetermined number of candidate functions that match the training data better than other candidate functions are split into two or more components each, and the split components recombined into new candidate functions that are then tested to determine how well test data generated from those new candidate functions match the training set data. One or more of those new candidate functions that are determined to generate test data that match the training set data better than the original candidate functions may then again be split, if desired, and recombined into a second set of new candidate functions, and so on, until one or more resulting candidate functions produce test data that are deemed to match the training set data within a predetermined margin of error, thus determining that the one or more candidate functions are acceptable, as discussed herein. Thus, machine learning module 113 learns the components of the best functions and uses those components to quickly iterate towards an optimum solution.

The machine learning module 113 can continue to generate candidate functions in successive iterations until an acceptable candidate function has been found. The machine learning module 113 can continue from one line of the new tax form to the next until all selected lines of the tax form have been correctly learned by the machine learning module 113.

In one embodiment, when all selected lines of the new tax form have been learned, the machine learning module 113 generates learned form data 121 that indicates that the new tax form has been learned. The learned form data 121 can also include acceptable functions for each selected line of the new tax form. The interface module 112 can output the learned form data 121 for review by an expert or other personnel.

In one embodiment, when the tax form has been learned by the machine learning module 113, the machine learning module 113 updates the current document instructions data 131 to include software instructions for completing the new tax form as part of the tax return preparation process.

Embodiments of the present disclosure provide a technical solution to longstanding problems associated with traditional electronic document preparation systems that do not adequately learn and incorporate new and/or updated forms into the electronic document preparation system. An electronic document preparation system in accordance with one or more embodiments provides more reliable financial management services by utilizing machine learning and training set data to learn and incorporate new and/or updated forms into the electronic document preparation system. The various embodiments of the disclosure can be implemented to improve the technical fields of data processing, data collection, resource management, and user experience. Therefore, the various described embodiments of the disclosure and their associated benefits amount to significantly more than an abstract idea. In particular, by utilizing machine learning to learn and incorporate new and/or updated forms in the electronic document preparation system, electronic document preparation system can more efficiently learn and incorporate new and/or updated forms into the electronic document preparation system.

Process

Figure 2:
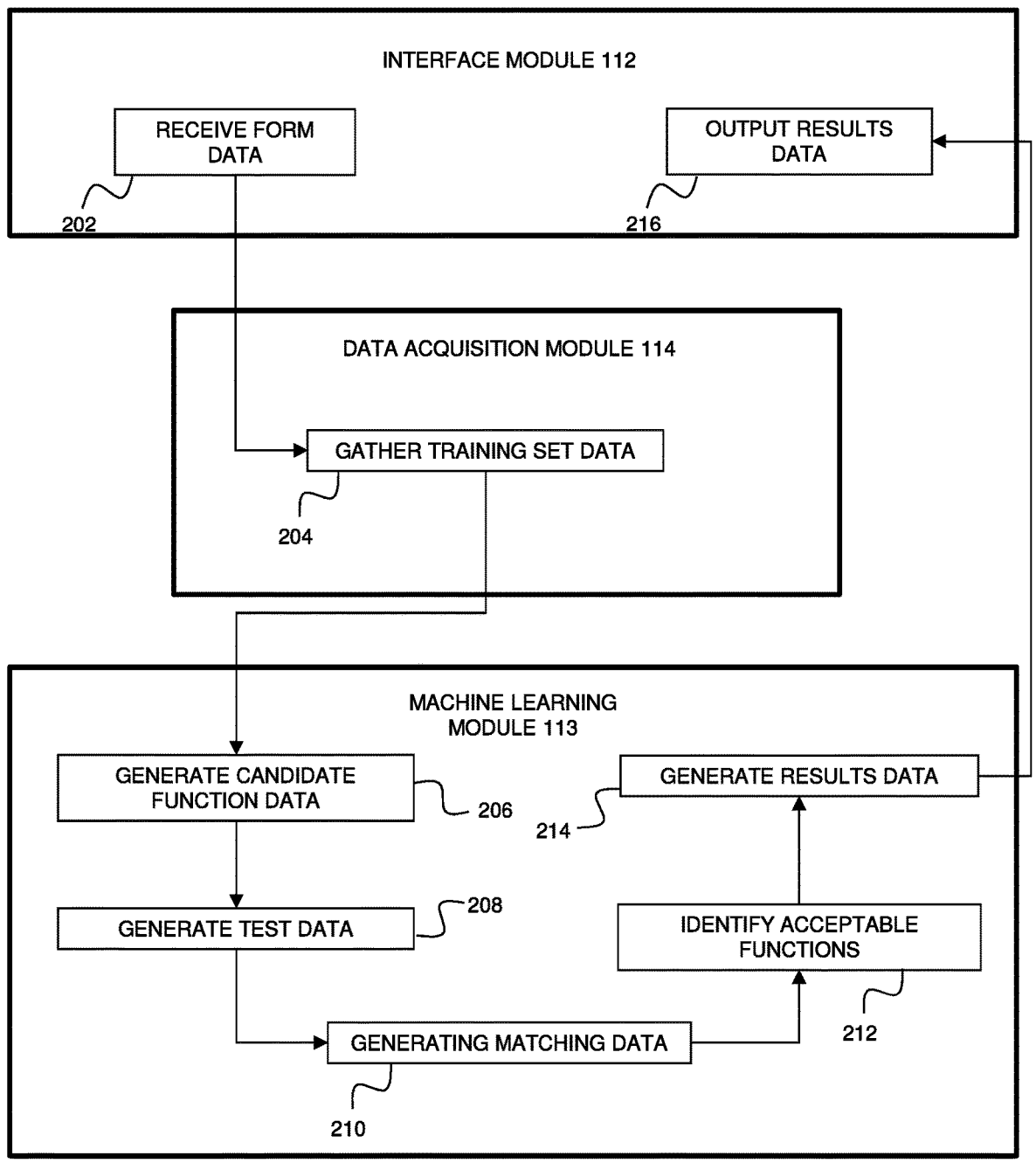
FIG. 2 is a block diagram of a process for learning and incorporating new and/or updated forms in an electronic document preparation system, in accordance with one embodiment.

FIG. 2 illustrates a functional flow diagram of a process 200 for learning and incorporating new and/or updated forms in an electronic document preparation system, in accordance with one embodiment.

At block 202 the user interface module 112 receives form data related to a new and/or updated form having a plurality of data fields that expect data values in accordance with specific functions, according to one embodiment. From block 202 the process proceeds to block 204.

At block 204 the data acquisition module 114 gathers training set data related to previously filled forms having completed data fields that each correspond to a respective data field of the new and/or updated form, according to one embodiment. From block 204 the process proceeds to block 206.

At block 206 the machine learning module 113 generates candidate function data including, for one or more data fields of the new and/or updated form, at least one candidate function, according to one embodiment. From block 206 the process proceeds to block 208.

At block 208 the machine learning module 113 generates test data by applying the candidate functions to the training set data, according to one embodiment. From block 208 the process proceeds to block 210.

At block 210 the machine learning module 113 generates matching data indicating how closely each candidate function matches the test data, according to one embodiment.

In one embodiment, a fitness function is used to determine that one or more candidate functions are acceptable. In one embodiment, the fitness function includes an error function, such as a root mean square error function, reflecting errors that may be present in test data associated with one or more data sets of the training set data, as discussed herein. Other error functions currently known to those of ordinary skill or later developed may be used without departing from the scope of this disclosure. Other components of a fitness function include, according to various embodiments, one or more of how many operators are present in the candidate function, how many operators depend on results of other operators completing prior operations, whether there are missing arguments in the candidate function, and whether an argument is repeated in the candidate function. The tax return preparation system then generates results data indicating whether the candidate function is acceptable and/or a fitness score, determined using a fitness function or an error function, or both, which may be used in a determination of a level of fitness, or a determination of a level of acceptability, for example.

In one embodiment, to form one or more new candidate functions, components of previously formed candidate functions that match the training data better than other candidate functions, but perhaps not enough to be determined acceptable functions, are used to generate new candidate functions which are then tested. In one embodiment, a component of a new candidate function includes one or more operators of the previously formed candidate function. In one embodiment, a component of a new candidate function includes one or more constants of the previously formed candidate function. In one embodiment, a component of a new candidate function includes one or more dependencies used to generate the previously formed candidate function.

In one embodiment, one or more of the predetermined number of candidate functions that match the training data better than other candidate functions are split into two or more components each, and the split components recombined into new candidate functions that are then tested to determine how well test data generated from those new candidate functions match the training set data. One or more of those new candidate functions that are determined to generate test data that match the training set data better than the original candidate functions may then again be split, if desired, and recombined into a second set of new candidate functions, and so on, until one or more resulting candidate functions produce test data that are deemed to match the training set data within a predetermined margin of error, thus determining that the one or more candidate functions are acceptable, as discussed herein. Thus, machine learning module 113 learns the components of the best functions and uses those components to quickly iterate towards an optimum solution. As discussed herein, determination of acceptability of a given candidate function or the determination of the fitness of a given candidate function includes, in one embodiment, an error function such as a root mean square, for each data set of the training set data, as discussed below. Other considerations include, according to various embodiments, include one or more of how many operators are present in the candidate function, how many operators depend on results of other operators completing prior operations, whether there are missing arguments in the candidate function, and whether an argument is repeated in the candidate function.

From block 210 the process proceeds to block 212.

At block 212, the machine learning module 113 identifies a respective acceptable function for each data field of the new and/or updated form based on the matching data. From block 212 the process proceeds to block 214.

At block 214 the machine learning module 113 generates results data indicating an acceptable function for each data field of the new and/or updated form, according to one embodiment. From block 214 the process proceeds to block 216. At block 216, the interface module 112 optionally outputs the results data for review by an expert or other personnel, according to one embodiment.

Although a particular sequence is described herein for the execution of the process 200, other sequences can also be implemented. For example, the data acquisition module can gather training set data each time a new data field of the new and/or updated form is to be learned. The machine learning module 113 can generate a single candidate function at a time and can generate test data and matching data for that candidate function and determine if the candidate function is acceptable based on the matching data. If the candidate function is not acceptable, the machine learning module 113 returns to step 206 and generates a new candidate function, as discussed herein, and repeats the process until an acceptable function has been found for the data field currently being learned. When an acceptable function is found for a particular data field, the data acquisition module can again gather training set data for the next data field and the machine learning module 113 can generate, test, and analyze candidate functions until an acceptable function has been found. The machine learning module 113 can generate candidate functions based on dependency data that indicates one or more possible dependencies for an acceptable function for a given data field. The machine learning module 113 can generate candidate functions by selecting one or more operators from a library of operators. Other sequences can also be implemented.

In one embodiment, following the determination of two or more candidate functions producing test data matching the training set data, a selection of a 'most' acceptable function may be desirable. In one embodiment, candidate functions producing test data matching the training set data are simplified, and candidate functions that contain the same operators, but which may have those operators in a different order, are combined into a single candidate function, and a desirability value is assigned to the resulting candidate function reflecting that the same candidate function was found more than once. The more times a same candidate function appears in results, the greater the desirability value. Further desirability values may be assigned or adjusted based on one or more other factors, in various embodiments, such as whether one operator or another is preferred for a given data field, whether a set of operators is preferred for a given data field, whether a particular type of operator is preferred for a given data field, and the like. Other factors known to those of ordinary skill may also be used in a desirability value determination, including factors that are later developed.

Figure 3:
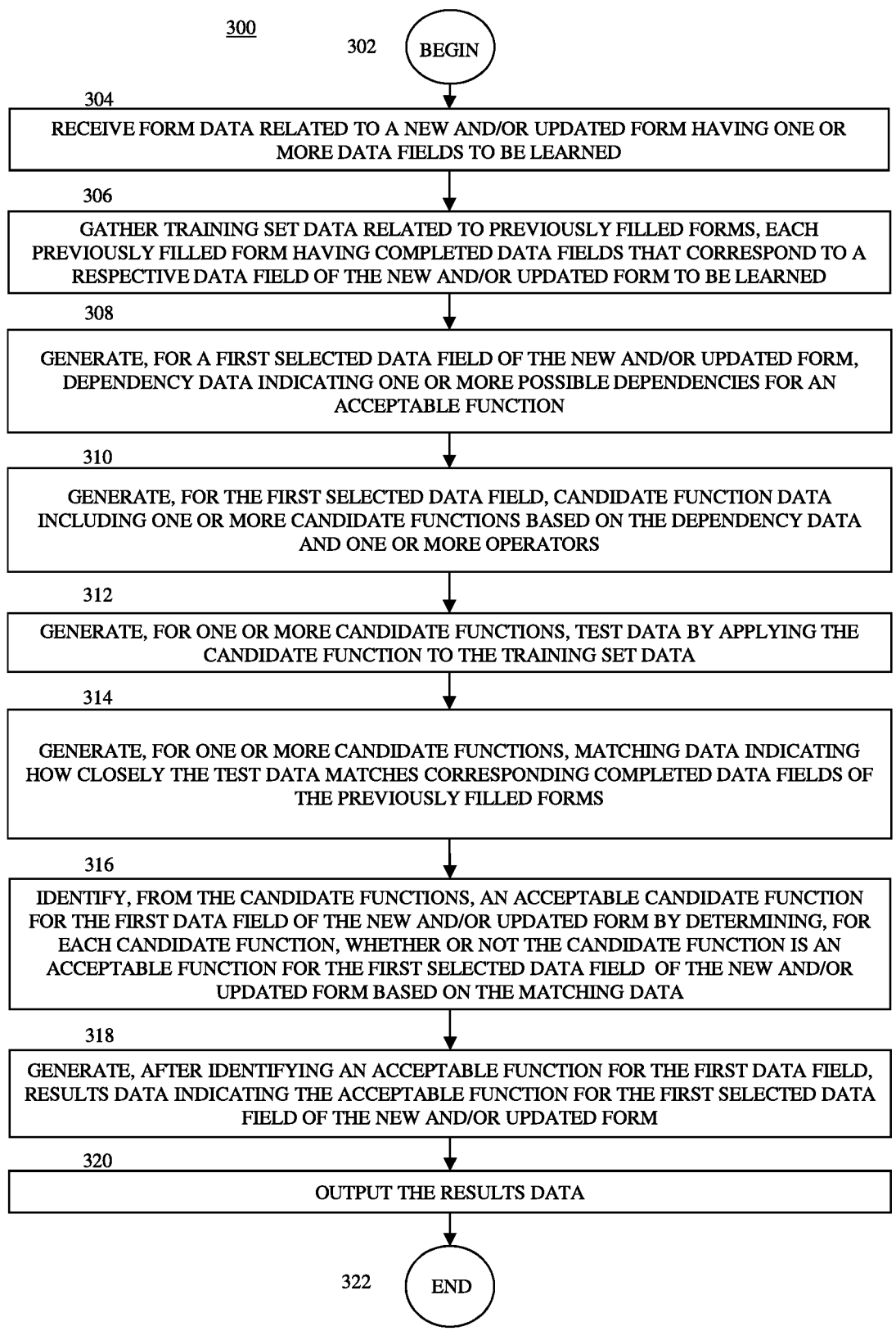
FIG. 3 is a flow diagram of a process for learning and incorporating new and/or updated forms in an electronic document preparation system, in accordance with one embodiment.

FIG. 3 illustrates a flow diagram of a process 300 for learning and incorporating new and/or updated forms in an electronic document preparation system, according to various embodiments.

In one embodiment, process 300 for learning and incorporating new and/or updated forms in an electronic document preparation system begins at BEGIN 302 and process flow proceeds to RECEIVE FORM DATA RELATED TO A NEW AND/OR UPDATED FORM HAVING ONE OR MORE DATA FIELDS TO BE LEARNED 304.

In one embodiment, at RECEIVE FORM DATA RELATED TO A NEW AND/OR UPDATED FORM HAVING ONE OR MORE DATA FIELDS TO BE LEARNED 304 process 300 for learning and incorporating new and/or updated forms in an electronic document preparation system receives form data related to a new and/or updated form having one or more data fields to be learned.

In one embodiment, once process 300 for learning and incorporating new and/or updated forms in an electronic document preparation system receives form data related to a new and/or updated form having a plurality of data fields at RECEIVE FORM DATA RELATED TO A NEW AND/OR UPDATED FORM HAVING ONE OR MORE DATA FIELDS TO BE LEARNED 304 process flow proceeds to GATHER TRAINING SET DATA RELATED TO PREVIOUSLY FILLED FORMS, EACH PREVIOUSLY FILLED FORM HAVING COMPLETED DATA FIELDS THAT CORRESPOND TO A RESPECTIVE DATA FIELD OF THE NEW AND/OR UPDATED FORM TO BE LEARNED 306.

In one embodiment, at GATHER TRAINING SET DATA RELATED TO PREVIOUSLY FILLED FORMS, EACH PREVIOUSLY FILLED FORM HAVING COMPLETED DATA FIELDS THAT CORRESPOND TO A RESPECTIVE DATA FIELD OF THE NEW AND/OR UPDATED FORM TO BE LEARNED 306, process 300 for learning and incorporating new and/or updated forms in an electronic document preparation system gathers training set data related to previously filled forms having one or more completed data fields that correspond to a data field of the new and/or updated form.

In one embodiment, one or more data values of the training set data representing previously filled forms is missing one or more data values, such as if a user previously filling in a first form didn't prepare a predicate form that relates to the current form being learned. In this case, a missing data value might be zero, or might be something different, but it is often not desirable to guess a data value to be substituted for that missing data value. Rather, in one embodiment, a known placeholder value is substituted for the missing data value, such as either a high positive value or high negative value, such as −99999 being substituted for the missing data value, in a data set of the training set data. In such circumstances, process 300 is configured to understand that a particular high positive value in a data set, or a particular high negative value indicates a missing data value in a given data set of the training set data.

In one embodiment, where an acceptable candidate function for a given data field of a form is expected to be complicated, one or more missing data values within a data set of the training data are replaced by a two-variable pair formed of a Boolean value and a float value where the Boolean value is set to 'true' if the data associated with the missing data value exists and the associated float value is set to the filled data value, and the Boolean value is set to 'false' if the field associated with the missing data value is missing and the associated float value is set to a predetermined known placeholder value, such as −99999 discussed above.

In one embodiment, once process 300 for learning and incorporating new and/or updated forms in an electronic document preparation system gathers training set data related to previously filled forms at GATHER TRAINING SET DATA RELATED TO PREVIOUSLY FILLED FORMS, EACH PREVIOUSLY FILLED FORM HAVING COMPLETED DATA FIELDS THAT CORRESPOND TO A RESPECTIVE DATA FIELD OF THE NEW AND/OR UPDATED FORM TO BE LEARNED 306, process flow proceeds to GENERATE, FOR A FIRST SELECTED DATA FIELD OF THE NEW AND/OR UPDATED FORM, DEPENDENCY DATA INDICATING ONE OR MORE POSSIBLE DEPENDENCIES FOR AN ACCEPTABLE FUNCTION 308.

In one embodiment, at GENERATE, FOR A FIRST SELECTED DATA FIELD OF THE NEW AND/OR UPDATED FORM, DEPENDENCY DATA INDICATING ONE OR MORE POSSIBLE DEPENDENCIES FOR AN ACCEPTABLE FUNCTION 308, process 300 for learning and incorporating new and/or updated forms in an electronic document preparation system generates, for a first selected data field of the plurality of data fields of the new and/or updated form, dependency data indicating one or more possible dependencies for an acceptable function that provides a proper data value for the first selected data field.

In one embodiment, once process 300 for learning and incorporating new and/or updated forms in an electronic document preparation system generates, for a first selected data field of the plurality of data fields of the new and/or updated form, dependency data indicating one or more possible dependencies for an acceptable function that provides a proper data value for the first selected data field at GENERATE, FOR A FIRST SELECTED DATA FIELD OF THE NEW AND/OR UPDATED FORM, DEPENDENCY DATA INDICATING ONE OR MORE POSSIBLE DEPENDENCIES FOR AN ACCEPTABLE FUNCTION 308, process flow proceeds to GENERATE, FOR THE FIRST SELECTED DATA FIELD, CANDIDATE FUNCTION DATA INCLUDING ONE OR MORE CANDIDATE FUNCTIONS BASED ON THE DEPENDENCY DATA AND ONE OR MORE OPERATORS 310.

In one embodiment, at GENERATE, FOR THE FIRST SELECTED DATA FIELD, CANDIDATE FUNCTION DATA INCLUDING ONE OR MORE CANDIDATE FUNCTIONS BASED ON THE DEPENDENCY DATA AND ONE OR MORE OPERATORS 310, process 300 for learning and incorporating new and/or updated forms in an electronic document preparation system generates, for the first selected data field, candidate function data including one or more candidate functions based on the dependency data and one or more operators. The candidate functions include, in various embodiments, one or more operators selected from a set of operators which includes logical and mathematical functionality. The operators include, in various embodiments, arithmetic operators such as addition, subtraction, multiplication, division or other mathematical operators, exponential functions, logical operators such as if-then operators, and/or Boolean operators such as true/false. The operators can include existence condition operators that depend on the existence of a data value in another data field of new and/or updated form, in a form other than the new and/or updated form, or in some other location or data set. The operators can include string comparisons and/or rounding or truncating operations, or operators representing any other functional operation that can operate on dependencies and constants to provide a suitable output data value for the data field being learned.

In one embodiment, once process 300 for learning and incorporating new and/or updated forms in an electronic document preparation system generates, for the first selected data field, candidate function data including one or more candidate functions based on the dependency data and one or more operators selected from a set of operators at GENERATE, FOR THE FIRST SELECTED DATA FIELD, CANDIDATE FUNCTION DATA INCLUDING ONE OR MORE CANDIDATE FUNCTIONS BASED ON THE DEPENDENCY DATA AND ONE OR MORE OPERATORS 310, process flow proceeds to GENERATE, FOR ONE OR MORE CANDIDATE FUNCTIONS, TEST DATA BY APPLYING THE CANDIDATE FUNCTION TO THE TRAINING SET DATA 312.

In one embodiment, at GENERATE, FOR ONE OR MORE CANDIDATE FUNCTIONS, TEST DATA BY APPLYING THE CANDIDATE FUNCTION TO THE TRAINING SET DATA 312 the process 300 generates, for each candidate function, test data by applying the candidate function to the training set data. The machine learning module 113 of FIG. 1 generates test values of test data 126, in one embodiment, by substituting at least a portion of the training set data for one or more of lines 31 and 2c in the candidate function and determining a result of performing the candidate function.

In one embodiment, once process 300 generates, for each candidate function, test data by applying the candidate function to the training set data at GENERATE, FOR ONE OR MORE CANDIDATE FUNCTIONS, TEST DATA BY APPLYING THE CANDIDATE FUNCTION TO THE TRAINING SET DATA 312 of FIG. 3, process flow proceeds to GENERATE, FOR ONE OR MORE CANDIDATE FUNCTIONS, MATCHING DATA INDICATING HOW CLOSELY THE TEST DATA MATCHES CORRESPONDING COMPLETED DATA FIELDS OF THE PREVIOUSLY FILLED FORMS 314.

In one embodiment, at GENERATE, FOR ONE OR MORE CANDIDATE FUNCTIONS, MATCHING DATA INDICATING HOW CLOSELY THE TEST DATA MATCHES CORRESPONDING COMPLETED DATA FIELDS OF THE PREVIOUSLY FILLED FORMS 314 the process 300 for learning and incorporating new and/or updated forms in an electronic document preparation system generates, for one or more candidate functions being learned, matching data. In one embodiment, the matching data is generated by comparing the test data to training set data corresponding to the first selected data field, the matching data indicating how closely the test data matches the corresponding completed data fields of the previously filled forms.

In one embodiment, a fitness function is used to determine whether one or more candidate functions are acceptable. In one embodiment, the fitness function includes consideration of an error function such as a square root of the sum of the squares of the differences between the desired output of a candidate function and the actual output of the candidate function, for each data set of the training set data, as discussed below. Other considerations included in a fitness function, according to various embodiments, are one or more of how many operators are present in the candidate function, how many operators depend on results of other operators completing prior operations, whether there are missing arguments in the candidate function, and whether an argument is repeated in the candidate function.

In one embodiment, once the process 300 for learning and incorporating new and/or updated forms in an electronic document preparation system generates, for each candidate function, matching data by comparing the test data to the completed data fields corresponding to the first selected data field, the matching data indicating how closely the test data matches the corresponding completed data fields of the previously filled forms at GENERATE, FOR ONE OR MORE CANDIDATE FUNCTIONS, MATCHING DATA INDICATING HOW CLOSELY THE TEST DATA MATCHES CORRESPONDING COMPLETED DATA FIELDS OF THE PREVIOUSLY FILLED FORMS 314, process flow proceeds to IDENTIFY, FROM THE CANDIDATE FUNCTIONS, AN ACCEPTABLE CANDIDATE FUNCTION FOR THE FIRST DATA FIELD OF THE NEW AND/OR UPDATED FORM BY DETERMINING, FOR EACH CANDIDATE FUNCTION, WHETHER OR NOT THE CANDIDATE FUNCTION IS AN ACCEPTABLE FUNCTION FOR THE FIRST SELECTED DATA FIELD OF THE NEW AND/OR UPDATED FORM BASED ON THE MATCHING DATA 316.

In one embodiment, at IDENTIFY, FROM THE CANDIDATE FUNCTIONS, AN ACCEPTABLE CANDIDATE FUNCTION FOR THE FIRST DATA FIELD OF THE NEW AND/OR UPDATED FORM BY DETERMINING, FOR EACH CANDIDATE FUNCTION, WHETHER OR NOT THE CANDIDATE FUNCTION IS AN ACCEPTABLE FUNCTION FOR THE FIRST SELECTED DATA FIELD OF THE NEW AND/OR UPDATED FORM BASED ON THE MATCHING DATA 316 the process 300 for learning and incorporating new and/or updated forms in an electronic document preparation system identifies, from the plurality of functions, an acceptable candidate function for the first data field of the new and/or updated form by determining, for the various candidate functions, whether or not the candidate function is an acceptable function for the first selected data field of the new and/or updated form based on the matching data.

If, at IDENTIFY, FROM THE CANDIDATE FUNCTIONS, AN ACCEPTABLE CANDIDATE FUNCTION FOR THE FIRST DATA FIELD OF THE NEW AND/OR UPDATED FORM BY DETERMINING, FOR EACH CANDIDATE FUNCTION, WHETHER OR NOT THE CANDIDATE FUNCTION IS AN ACCEPTABLE FUNCTION FOR THE FIRST SELECTED DATA FIELD OF THE NEW AND/OR UPDATED FORM BASED ON THE MATCHING DATA 316, the matching data may indicate that there are no acceptable candidate functions among the candidate functions being considered. If so, new candidate functions are generated and considered.

In one embodiment, to form one or more new candidate functions, components of previously formed candidate functions, such as previously formed candidate functions that match the training data better than other candidate functions but perhaps not enough to be determined acceptable functions, are used to generate new candidate functions which are then tested. In one embodiment, a component of a new candidate function includes one or more operators of a previously formed candidate function. In one embodiment, a component of a new candidate function includes one or more constants of the previously formed candidate function. In one embodiment, a component of a new candidate function includes one or more dependencies used to generate the previously formed candidate function.

In one embodiment, one or more of the predetermined number of candidate functions that match the training data better than other candidate functions are split into two or more components each, and the split components recombined into new candidate functions that are then tested to determine how well test data generated from those new candidate functions match the training set data. One or more of those new candidate functions that are determined to generate test data that match the training set data better than the original candidate functions may then again be split, if desired, and recombined into a second set of new candidate functions, and so on, until one or more resulting candidate functions produce test data that are deemed to match the training set data within a predetermined margin of error, as discussed herein. Thus, machine learning module 113 of FIG. 1 learns the components of the best functions and uses those components to quickly iterate towards an optimum solution.

In one embodiment, once the process 300 for learning and incorporating new and/or updated forms in an electronic document preparation system identifies, from the plurality of functions, an acceptable candidate function for the first data field of the new and/or updated form by determining, for each candidate function, whether or not the candidate function is an acceptable function for the first selected data field of the new and/or updated form based on the matching data at IDENTIFY, FROM THE CANDIDATE FUNCTIONS, AN ACCEPTABLE CANDIDATE FUNCTION FOR THE FIRST DATA FIELD OF THE NEW AND/OR UPDATED FORM BY DETERMINING, FOR EACH CANDIDATE FUNCTION, WHETHER OR NOT THE CANDIDATE FUNCTION IS AN ACCEPTABLE FUNCTION FOR THE FIRST SELECTED DATA FIELD OF THE NEW AND/OR UPDATED FORM BASED ON THE MATCHING DATA 316, process flow proceeds to GENERATE, AFTER IDENTIFYING AN ACCEPTABLE FUNCTION FOR THE FIRST DATA FIELD, RESULTS DATA INDICATING THE ACCEPTABLE FUNCTION FOR THE FIRST SELECTED DATA FIELD OF THE NEW AND/OR UPDATED FORM 318.

In one embodiment, at GENERATE, AFTER IDENTIFYING AN ACCEPTABLE FUNCTION FOR THE FIRST DATA FIELD, RESULTS DATA INDICATING THE ACCEPTABLE FUNCTION FOR THE FIRST SELECTED DATA FIELD OF THE NEW AND/OR UPDATED FORM 318, the process 300 for learning and incorporating new and/or updated forms in an electronic document preparation system generates, after identifying an acceptable function for the first data field, results data indicating the acceptable function for the first selected data field of the new and/or updated form. If more than one acceptable function has been found, the results data may optionally include more than one of the identified acceptable functions.

In one embodiment, once the process 300 for learning and incorporating new and/or updated forms in an electronic document preparation system generates, after identifying an acceptable function for the first selected data field, results data indicating the acceptable function for the first data field of the new and/or updated form at GENERATE, AFTER IDENTIFYING AN ACCEPTABLE FUNCTION FOR THE FIRST DATA FIELD, RESULTS DATA INDICATING THE ACCEPTABLE FUNCTION FOR THE FIRST SELECTED DATA FIELD OF THE NEW AND/OR UPDATED FORM 318 proceeds to OUTPUT THE RESULTS DATA 320.

In one embodiment, at OUTPUT THE RESULTS DATA 320 the process 300 for learning and incorporating new and/or updated forms in an electronic document preparation system outputs the results data.

In one embodiment, once the process 300 for learning and incorporating new and/or updated forms in an electronic document preparation system outputs the results data at OUTPUT THE RESULTS DATA 320, process flow proceeds to END 322 where the process awaits further input.

In one embodiment, at END 322 the process for learning and incorporating new and/or updated forms in an electronic document preparation system is exited to await new data and/or instructions.

In one embodiment, following the determination of two or more candidate functions producing test data matching the training set data, a selection of a 'most' acceptable function may be desirable. In one embodiment, candidate functions producing test data matching the training set data are simplified, and candidate functions that contain the same operators, but which may have those operators in a different order, are combined into a single candidate function, and a desirability value is assigned to the resulting candidate function reflecting that the same candidate function was found more than once. The more times a same candidate function appears in results, the greater the desirability value. Further desirability values may be assigned or adjusted based on one or more other factors, in various embodiments, such as whether one operator or another is preferred for a given data field, whether a set of operators is preferred for a given data field, whether a particular type of operator is preferred for a given data field, and the like. Other factors known to those of ordinary skill may also be used in a desirability value determination, including factors that are later developed.

In one embodiment, there is a need to identify specific candidate functions that perform better, i.e. have a lower error or otherwise have test results that differ from the training set data less than other candidate functions, and use one or more components of those specific candidate functions to form new candidate functions, in order to arrive at an acceptable solution very quickly.

Figure 4:
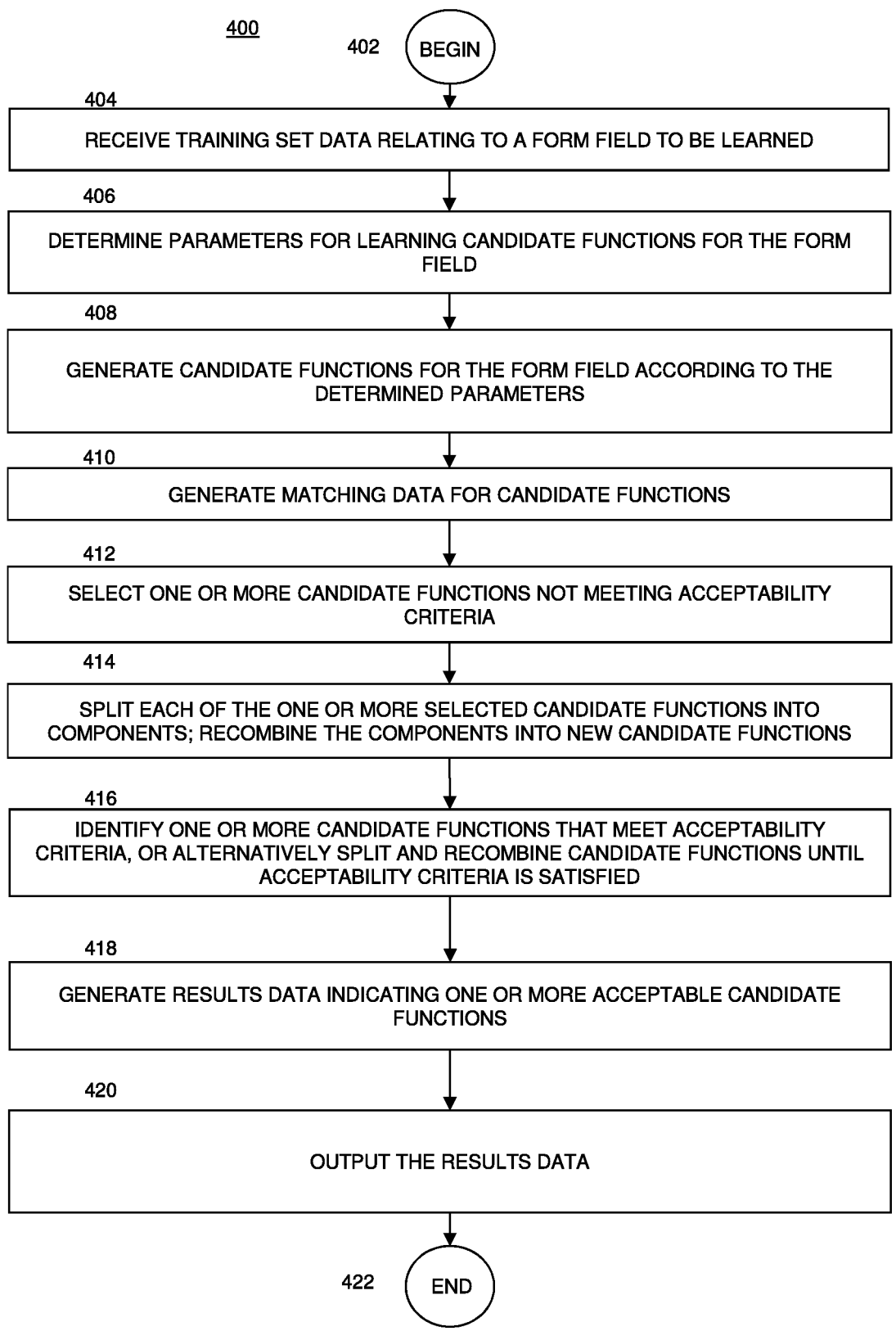
FIG. 4 is a flow diagram of a process for learning and incorporating new and/or updated forms in an electronic document preparation system, in accordance with one embodiment.

FIG. 4 is a flow diagram of a process 400 for learning and incorporating new and/or updated forms in an electronic document preparation system, in accordance with one embodiment.

In one embodiment, process 400 for learning and incorporating new and/or updated forms in an electronic document preparation system begins at BEGIN 402 and process flow proceeds to RECEIVE TRAINING SET DATA RELATING TO A FORM FIELD TO BE LEARNED 404.

In one embodiment, at RECEIVE TRAINING SET DATA RELATING TO A FORM FIELD TO BE LEARNED 404, training set data is received as discussed above with respect to GATHER TRAINING SET DATA RELATED TO PREVIOUSLY FILLED FORMS, EACH PREVIOUSLY FILLED FORM HAVING COMPLETED DATA FIELDS THAT CORRESPOND TO A RESPECTIVE DATA FIELD OF THE NEW AND/OR UPDATED FORM TO BE LEARNED 306 of FIG. 3. Here, we are focusing our example on a single data field of a form to be learned, and thus only need training set data of the single data field to be learned, including training set data for any other data fields that are used in the determination of a data value for the single data field being learned. For example, if a data field for line 5 of a given form is being learned, and line 5 depends from line 2b of the same form and line 12 of a different form, the training set data will include many different sets of data, where those sets of data ideally include at least lines 2b and 12, and also data from line 5, the field being learned.

The received training set data will typically include hundreds, thousands, or possibly even millions of sets of data from previously filed tax returns, or from other data sources, depending on the character of the data field being learned. In some instances, a large number of data sets of the received training set data is duplicative, i.e. uses identical data values in lines 2b and 12, for example, thus resulting in the same training set value for line 5 as well. In one embodiment, the received training set data is processed to eliminate duplicate data sets, retaining only one copy for use in learning a function for line 5. Further, in situations where there is a bound placed on data values allowed of a given data field, and where the training set data includes data values outside of that bound, it may be beneficial to eliminate data sets from the training set data those data sets that have data values exceeding that bound. In one embodiment, where line 2b of the example above is only allowed to be a positive number, any data sets of the training set data that have a negative number for line 2b is eliminated from the received training set data. Other observations may also be made, automatically by a computing system, such as determining that one or more of the data values of one or more data sets are zero, such as if one or more of line 2b or line 12 is zero in those data sets. If the number of data sets having a data value of zero is large, it may be advantageous in some situations to eliminate all but a few such data sets, thus reducing the data sets of the training set data. By reducing the number of data sets being used to learn functions, significant time savings is achieved, in addition to significantly reducing memory requirements and processor cycles needed to accomplish the processes described herein.

Further details on forming training data sets may be found in the U.S. Patent application filed Oct. 13, 2016, Ser. No. 15/292,510, and entitled SYSTEM AND METHOD FOR SELECTING DATA SAMPLE GROUPS FOR MACHINE LEARNING OF CONTEXT OF DATA FIELDS FOR VARIOUS DOCUMENT TYPES AND/OR FOR TEST DATA GENERATION FOR QUALITY ASSURANCE SYSTEMS naming inventor Cem Unsal which is incorporated herein by reference in its entirety as if it was fully set forth herein.

In one embodiment, following the receipt of training set data at RECEIVE TRAINING SET DATA RELATING TO A FORM FIELD TO BE LEARNED 404 of FIG. 4, process flow proceeds to DETERMINE PARAMETERS FOR LEARNING CANDIDATE FUNCTIONS FOR THE FORM FIELD 406.

In one embodiment, at DETERMINE PARAMETERS FOR LEARNING CANDIDATE FUNCTIONS FOR THE FORM FIELD 406, one or more parameters to be incorporated into the learning process are determined. In some embodiments, limits are placed on the number of functions to be generated and tested in a single cycle of the process. For example, it may be desirable to generate and test no more than 200 functions at a time, and then rank those functions according to how closely test data from those functions match the training set data for the particular line of a form associated with the function. In one or more embodiments, if a given form is likely to have less complex functions that can be used to determine one or more data values associated with various data fields of the form, it may be desirable to limit the number of operators to be used in a given candidate function. In a third example, it may be desirable in some circumstances to limit the number of times particular operators are used in a given candidate function. Thus, according to these examples, parameters that may be used in a given instance of the process may include one or more of a maximum number of functions to be generated and tested in a given cycle of the process, a maximum number of operators to be used in candidate functions generated and tested in a given cycle of the process, a maximum total number of candidate functions to be generated and tested prior to the process pausing and presenting results data to a user or other expert, a maximum number of rounds of generating and testing candidate functions, and a maximum number of times particular operators are used in a given candidate function, or any combination thereof. Other parameters may be developed and used in the processes described herein without departing from the teachings of the present disclosure. In this disclosure, the parameters further include, but are not limited to the dependencies discussed herein.

In one embodiment, following the determination of one or more parameters to be incorporated into the function learning process at DETERMINE PARAMETERS FOR LEARNING CANDIDATE FUNCTIONS FOR THE FORM FIELD 406, process flow proceeds at GENERATE CANDIDATE FUNCTIONS FOR THE FORM FIELD ACCORDING TO THE DETERMINED PARAMETERS 408.

In one embodiment, at GENERATE CANDIDATE FUNCTIONS FOR THE FORM FIELD ACCORDING TO THE DETERMINED PARAMETERS 408, one or more candidate functions are generated according to the parameters determined at DETERMINE PARAMETERS FOR LEARNING CANDIDATE FUNCTIONS FOR THE FORM FIELD 406. If, for example, a parameter indicates a maximum number of candidate functions to be tested in a given cycle of the process is one hundred, only one hundred or fewer candidate functions are generated at a time. Further, if there is also a parameter indicating that the maximum number of operators in a given candidate function is twenty, then each generated candidate function will contain twenty or fewer operators. If, as a third example, a parameter indicates a maximum number of times a given operator may appear in a given candidate function is four, then each generated candidate function will not generate any candidate functions having any particular operator appearing more than four times. As discussed above, the parameters may also include dependencies, such as other lines that a data field of the current line needs to be determined correctly. Therefore, in one embodiment, candidate functions generated at GENERATE CANDIDATE FUNCTIONS FOR THE FORM FIELD ACCORDING TO THE DETERMINED PARAMETERS 408 will include consideration of those dependencies. For example, a data field depending on line 2 and having a constant of 3000 will consider, and perhaps include, one or more of those dependencies when generating the candidate functions. It is not necessarily true that each dependency will be overtly present in each candidate function. It has been seen, for example, that a seemingly complex line in a tax return that has complicated accompanying instructions depending on many factors may actually be able to be determined with a single operator function copying a data value from a worksheet or other data field. This is largely due to many different scenarios the current line is designed to cover rarely or never actually take place.

In one embodiment, once candidate functions are generated at GENERATE CANDIDATE FUNCTIONS FOR THE FORM FIELD ACCORDING TO THE DETERMINED PARAMETERS 408, process flow proceeds at GENERATE MATCHING DATA FOR CANDIDATE FUNCTIONS 410. In one embodiment, this process operation includes one or more operations previously discussed with respect to FIG. 3, including one or more of GENERATE, FOR ONE OR MORE CANDIDATE FUNCTIONS, TEST DATA BY APPLYING THE CANDIDATE FUNCTION TO THE TRAINING SET DATA 312 of FIG. 3 and GENERATE, FOR ONE OR MORE CANDIDATE FUNCTIONS, MATCHING DATA INDICATING HOW CLOSELY THE TEST DATA MATCHES CORRESPONDING COMPLETED DATA FIELDS OF THE PREVIOUSLY FILLED FORMS 314. In one embodiment, once test data is generated by, for example, substituting a portion of training set data associated with one or more dependencies, that test data is compared against an actual, known correct data value of the training set data associated with the current line associated with the function being learned. An error function may be used to provide an indication of how closely the actual, known correct data value of the training set data matches the test data generated by the candidate function. Continuing the example above where line 2b of the same form as the data field and function being learned and line 12 of a different form are dependencies associated with line 5 of a current form, where a function for line 5 is being learned, each data set of the training set data used to learn an acceptable function includes at least three data values, the values for line 2b and line 5 of the current form and line 12 of a different form. Furthering the example, assume that there are twenty-four such data sets within the training set data. When test data is generated, each of the respective data values for line 2b and line 5 are substituted, if needed, into a given candidate function being considered, resulting in a line 5 result in the test data. Thus, if all twenty-four data sets are used, then there will be twenty-four data values representing the line 5 test data results for the various data sets. Each of those twenty-four data values representing the line 5 within the test data are compared with the respective line 5 data values within the training set data. Some of the twenty-four line 5 data values may match their line 5 counterpart data values within the training set data exactly, while others may match closely, but not exactly, while yet others may not even be close matches.

In one embodiment, at GENERATE MATCHING DATA FOR CANDIDATE FUNCTIONS 410 of FIG. 4, the matching data is in the form of a confidence score which includes consideration of how many data values of the test data match their line counterpart data values within the training set data, with points being assigned to a given candidate function based on a percentage of those values that match. In one embodiment, higher numbers of points are assigned for higher percentages of the values matching, reflecting a preference for higher percentages of matches, where candidate functions having higher numbers of points are preferred over candidate functions having lower numbers of points.

In one embodiment, a given candidate function is further assigned an additional points value depending on whether the candidate function uses one or more operators more than once. In one embodiment, higher numbers of points are assigned for functions using operators fewer numbers of times with candidate functions having higher numbers of points being preferred over candidate functions having lower numbers of points.

In one embodiment, a given candidate function is further assigned an additional points value depending on whether the candidate function is shorter than other candidate functions. In one embodiment, higher numbers of points are assigned for shorter functions with candidate functions having higher numbers of points being preferred over candidate functions having lower numbers of points. In one embodiment, a shorter candidate function is a candidate function having a fewer total number of operators present in the candidate function. In one embodiment, a shorter candidate function is a candidate function having a fewer total number of operators and constants present in the candidate function. In one embodiment, a shorter candidate function is a candidate function having a fewer total number of operators and dependencies present in the candidate function.

In one embodiment, a fitness function is used to determine whether one or more candidate functions are acceptable. In one embodiment, the fitness function includes consideration of an error function such as a square root of the sum of the squares of the differences between the desired output of a candidate function and the actual output of the candidate function, for each data set of the training set data, as discussed below. Other considerations included in a fitness function, according to various embodiments, are one or more of how many operators are present in the candidate function, how many operators depend on results of other operators completing prior operations, whether there are missing arguments in the candidate function, and whether an argument is repeated in the candidate function.

Many other types of matching data reflecting the degree of preference of one or more candidate functions over other candidate functions may be developed and used similarly, without departing from the scope and teachings of this disclosure.

It may be desirable, in some situations, to discontinue producing new candidate functions, such as if an error function or a fitness function discussed herein reflects that the fitness, or acceptability, of the entire population is within a predetermined margin, such as if fitness values for each candidate function determined using a fitness function discussed herein are all within 10% of each other, or if a standard deviation of the fitness values is below a certain predetermined value, or using other criteria. Thus, a process operation to test exit conditions is performed at any point during the operation of process 400, using any exit criteria desired by an implementer of process 400. If an exit condition is found to be satisfied, the process exits. In one embodiment, as the process exits, results data is produced reflecting one or more candidate functions. In one embodiment, the one or more candidate functions of the results data includes at least one candidate function which is a better or more acceptable candidate function than at least one other candidate function. In one embodiment, acceptability or a determination of whether one candidate function is better than another candidate function is based on comparing the results of applying a fitness function to test data associated with the candidate functions.

Exit criteria may include a wide variety of conditions. Such conditions include, in various embodiment, a minimum value of an error function associated with the population of candidate functions remaining unchanged within a most recent predetermined number of iterations of process 400, and/or a predefined number of iterations of process 400 have already occurred, In one embodiment, once matching data has been generated at GENERATE MATCHING DATA FOR CANDIDATE FUNCTIONS 410, process flow proceeds at SELECT ONE OR MORE CANDIDATE FUNCTIONS NOT MEETING ACCEPTABILITY CRITERIA 412.

In one embodiment, at SELECT ONE OR MORE CANDIDATE FUNCTIONS NOT MEETING ACCEPTABILITY CRITERIA 412 there is acceptability criteria that must be met in order for a given candidate function to be determined to be an acceptable candidate function so that learning may be considered to be complete. In one embodiment, using the example provided above where the matching data include points being assigned to a candidate function based on one or more factors such as the length of the function, how many data sets are matched by the test data, etc., the acceptability criteria includes a threshold number of points a given candidate function must have in order to be considered acceptable.

In one embodiment, after having been evaluated at GENERATE MATCHING DATA FOR CANDIDATE FUNCTIONS 410, each candidate function has a number of points assigned. In a system, like the examples above, where having a greater number of points is better than having fewer points, a given candidate function is not acceptable if it has fewer than a threshold number of points assigned to it.

In one embodiment, at SELECT ONE OR MORE CANDIDATE FUNCTIONS NOT MEETING ACCEPTABILITY CRITERIA 412 any candidate functions not meeting acceptability criteria, such as not having enough points assigned to exceed a threshold number of points, are determined. In one embodiment, only a predetermined number of candidate functions are selected from all of the candidate functions generated at GENERATE CANDIDATE FUNCTIONS FOR THE FORM FIELD ACCORDING TO THE DETERMINED PARAMETERS 408. In one embodiment, the predetermined number of candidate functions selected at SELECT ONE OR MORE CANDIDATE FUNCTIONS NOT MEETING ACCEPTABILITY CRITERIA 412 are the best candidate functions, as determined by those candidate functions having the highest number of points, or those candidate functions having the lowest error, or using any other criteria known to those of ordinary skill or developed later. In one example, assume two hundred candidate functions were generated at GENERATE CANDIDATE FUNCTIONS FOR THE FORM FIELD ACCORDING TO THE DETERMINED PARAMETERS 408. Further assume that none of the candidate functions meet acceptability criteria, such as a point threshold discussed above. In one embodiments, at SELECT ONE OR MORE CANDIDATE FUNCTIONS NOT MEETING ACCEPTABILITY CRITERIA 412, a subset of the 200 generated candidate functions are selected for further processing. In one embodiment, the subset includes the best twenty candidate functions selected, based on the matching data of GENERATE MATCHING DATA FOR CANDIDATE FUNCTIONS 410.

In one embodiment, tested candidate functions may be grouped into random groups of a predetermined size, and the best one or more candidate functions in each group may also/instead be selected at SELECT ONE OR MORE CANDIDATE FUNCTIONS NOT MEETING ACCEPTABILITY CRITERIA 412.

Many other options for selecting candidate functions to be at least partly used in process operations below are possible, with the variation remaining under the scope of this disclosure.

Once one or more candidate functions not meeting acceptability criteria are selected at SELECT ONE OR MORE CANDIDATE FUNCTIONS NOT MEETING ACCEPTABILITY CRITERIA 412, process flow proceeds to SPLIT EACH OF THE ONE OR MORE SELECTED CANDIDATE FUNCTIONS INTO COMPONENTS; RECOMBINE THE COMPONENTS INTO NEW CANDIDATE FUNCTIONS 414.

In one embodiment, at SPLIT EACH OF THE ONE OR MORE SELECTED CANDIDATE FUNCTIONS INTO COMPONENTS; RECOMBINE THE COMPONENTS INTO NEW CANDIDATE FUNCTIONS 414, one or more of the candidate functions selected at SELECT ONE OR MORE CANDIDATE FUNCTIONS NOT MEETING ACCEPTABILITY CRITERIA 412 are split into two or more components. One or more of those components are then recombined with other candidate functions, or other components, resulting in new candidate functions.

In one embodiment, one or more candidate functions are split at or near a halfway point, leaving equal or relatively equal numbers of operators in each of the resulting components. In one embodiment, in the case of a candidate function having an odd number of operators, the candidate function is split, resulting in two components, where one of the components has one operators more than the component. In one embodiment, one or more candidate functions are split into three or more components. Further, it is not necessary that each candidate function be split into the same number of components. Finally, one or more components from a first split candidate function may be recombined with components from one, two, three or more other split candidate functions.

If it is desirable in a given implementation to generate additional candidate functions from the original candidate functions, one or more of the original candidate functions are used, in one embodiment, to generate one or more new candidate functions through process 400 randomly replacing one or more portions of the original candidate function. In one embodiment, randomly replacing one or more portions of the original candidate function includes replacing one or more operators and/or constants in the original candidate function with one or more different operators. In one embodiment, the one or more different operators are randomly selected. In one embodiment, the one or more different operators are selected from a group of operators not already present in the original candidate function.

In one embodiment, one or more of the original candidate functions are grouped with or otherwise used in a future fitness evaluation/test cycle with the new candidate functions. Thus, those original candidate functions that are used in a later evaluation/test cycle will also be referred to as new candidate functions just to ensure that one or more operations described herein as being performed on new candidate functions may also be performed on those original candidate functions.

In one embodiment, once new candidate functions are generated at SPLIT EACH OF THE ONE OR MORE SELECTED CANDIDATE FUNCTIONS INTO COMPONENTS; RECOMBINE THE COMPONENTS INTO NEW CANDIDATE FUNCTIONS 414, process flow proceeds to IDENTIFY ONE OR MORE CANDIDATE FUNCTIONS THAT MEET ACCEPTABILITY CRITERIA, OR ALTERNATIVELY SPLIT AND RECOMBINE CANDIDATE FUNCTIONS UNTIL ACCEPTABILITY CRITERIA IS SATISFIED 416.

In one embodiment, the process flow continues by testing the new candidate functions and identifying, using matching data or otherwise any candidate functions meeting acceptability criteria, any of the new candidate functions that are acceptable. If no candidate functions found to be acceptable, process flow repeats the splitting, recombining, and testing operations until one or more acceptable candidate functions are found. Following one or more acceptable candidate functions being found, process flow proceeds to GENERATE RESULTS DATA INDICATING ONE OR MORE ACCEPTABLE CANDIDATE FUNCTIONS 418.

In one embodiment, at GENERATE RESULTS DATA INDICATING ONE OR MORE ACCEPTABLE CANDIDATE FUNCTIONS 418, results data is generated indicating one or more acceptable functions. If more than one acceptable function has been found, the results data may optionally include more than one of the acceptable functions.

In one embodiment, process flow then proceeds to OUTPUT THE RESULTS DATA 420.

In one embodiment, at OUTPUT THE RESULTS DATA 420 the results data are provided to one or more users of the process as discussed herein after which process flow proceeds to END 422 where the process awaits further input.

In one embodiment, at END 422 the process for learning and incorporating new and/or updated forms in an electronic document preparation system is exited to await new data and/or instructions.

In one embodiment, following the determination of two or more candidate functions producing test data matching the training set data, a selection of a 'most' acceptable function may be desirable. In one embodiment, candidate functions producing test data matching the training set data are simplified, and candidate functions that contain the same operators, but which may have those operators in a different order, are combined into a single candidate function, and a desirability value is assigned to the resulting candidate function reflecting that the same candidate function was found more than once. The more times a same candidate function appears in results, the greater the desirability value. Further desirability values may be assigned or adjusted based on one or more other factors, in various embodiments, such as whether one operator or another is preferred for a given data field, whether a set of operators is preferred for a given data field, whether a particular type of operator is preferred for a given data field, and the like. Other factors known to those of ordinary skill may also be used in a desirability value determination, including factors that are later developed. In one embodiment, a desirability value as discussed herein is a component of a fitness function used to determine a level of acceptability or fitness of a given candidate function.

As noted above, the specific illustrative examples discussed above are but illustrative examples of implementations of embodiments of the method or process for learning and incorporating new and/or updated forms in an electronic document preparation system. Those of skill in the art will readily recognize that other implementations and embodiments are possible. Therefore, the discussion above should not be construed as a limitation on the claims provided below.

In one embodiment, a computing system implements a method for learning and incorporating new and/or updated forms in an electronic document preparation system. The method includes receiving form data related to a new and/or updated form having a plurality of data fields and gathering training set data related to previously filled forms. Each previously filled form has completed data fields that each correspond to a respective data field of the new and/or updated form. The method also includes generating, for a first selected data field from the plurality of data fields of the new and/or updated form, candidate function data including a plurality of candidate input functions for providing a proper data value for the first selected data field, generating, for each candidate function, test data by applying the candidate function to the training set data, and generating, for each candidate function, matching data by comparing the test data to the completed data fields corresponding to the first selected data field. The matching data indicates how closely the test data matches the corresponding completed data fields of the previously filled forms. The method also includes identifying, from the plurality of functions, an acceptable candidate function for the first data field of the new and/or updated form by determining, for each candidate function, whether or not the candidate function is an acceptable function for the first selected data field of the new and/or updated form based on the matching data. The method also includes generating, after identifying an acceptable function for the first data field, results data indicating an acceptable function for the first data field of the new and/or updated form and outputting the results data.

In one embodiment, a non-transitory computer-readable medium has a plurality of computer-executable instructions which, when executed by a processor, perform a method for learning and incorporating new and/or updated forms in an electronic document preparation system. The instructions include an interface module configured to receive form data representing to a new and/or updated form having a plurality of data fields and a data acquisition module configured to gather training set data related to previously filled forms. Each previously filled form has completed data fields that each correspond to a respective data field of the new and/or updated form. The instructions also include a machine learning module configured to identify a respective acceptable function for each of the data fields of the new and/or updated form by generating candidate function data relating to a plurality of candidate functions, generating test data by applying the candidate functions to the training set data, and finding, for each of the data fields a respective acceptable function from the plurality of candidate functions based on a how closely the test data matches the candidate function data.

One embodiment is a system for learning and incorporating new and/or updated forms in an electronic document preparation system. The system includes at least one processor and at least one memory coupled to the at least one processor, the at least one memory having stored therein instructions which, when executed by any set of the one or more processors, perform a process. The process includes receiving, with an interface module of a computing system, form data related to a new and/or updated form having a plurality of data fields and gathering training set data related to previously filled forms. Each previously filled form has completed data fields that each correspond to a respective data field of the new and/or updated form. The process also includes generating, with a data acquisition module of a computing system, for a first selected data field from the plurality of data fields of the new and/or updated form, candidate function data including a plurality of candidate input functions for providing a proper data value for the first selected data field. The process also includes generating, with a machine learning module of a computing system, for each candidate function, test data by applying the candidate function to the training set data and generating, for each candidate function, matching data by comparing the test data to the completed data fields corresponding to the first selected data field. The matching data indicates how closely the test data matches the corresponding completed data fields of the previously filled forms. The process also includes identifying, with the machine learning module, from the plurality of functions, an acceptable candidate function for the first data field of the new and/or updated form by determining, for each candidate function, whether or not the candidate function is an acceptable function for the first selected data field of the new and/or updated form based on the matching data. The process also includes generating, with the machine learning module, after identifying an acceptable function for the first data field, results data indicating an acceptable function for the first data field of the new and/or updated form and outputting, with the interface module, the results data.

One embodiment is a computing system implemented method for learning and incorporating new and/or updated forms in an electronic document preparation system. The method includes receiving form data related to a new and/or updated form having a plurality of data fields, gathering training set data related to previously filled forms. Each previously filled form has completed data fields that each correspond to a respective data field of the new and/or updated form. The method also includes generating, for a first selected data field of the plurality of data fields of the new and/or updated form, dependency data indicating one or more possible dependencies for an acceptable function that provides a proper data value for the first selected data field. The method further includes generating, for the first selected data field, candidate function data including a plurality of candidate functions based on the dependency data and one or more operators selected from a library of operators, generating, for each candidate function, test data by applying the candidate function to the training set data, and generating, for each candidate function, matching data by comparing the test data to the completed data fields corresponding to the first selected data field, the matching data indicating how closely the test data matches the corresponding completed data fields of the previously filled forms. The method also includes identifying, from the plurality of functions, an acceptable candidate function for the first selected data field of the new and/or updated form by determining, for each candidate function, whether or not the candidate function is an acceptable function for the first selected data field of the new and/or updated form based on the matching data, generating, after identifying an acceptable function for the first data field, results data indicating an acceptable for the first data field of the new and/or updated form, and outputting the results data.

One embodiment is a non-transitory computer-readable medium having a plurality of computer-executable instructions which, when executed by a processor, perform a method for learning and incorporating new and/or updated forms in an electronic document preparation system. The instructions include an interface module configured to receive form data representing to a new and/or updated form having a plurality of data fields. The instructions include a data acquisition module configured to gather training set data related to previously filled forms. Each previously filled form has completed data fields that each correspond to a respective data field of the new and/or updated form. The instructions also include a machine learning module configured to identify a respective acceptable function for each of the data fields of the new and/or updated form by generating candidate function data relating to a plurality of candidate functions based on dependency data indicating possible dependencies for each data field of the new and/or updated form and including one or more operators from a library of operators, generating test data by applying the candidate functions to the training set data, and finding, for each of the data fields a respective acceptable function from the plurality of candidate functions based on a how closely the test data matches the candidate function data.

One embodiment is a system for learning and incorporating new and/or updated forms in an electronic document preparation system. The system includes at least one processor at least one memory coupled to the at least one processor. The at least one memory has stored therein instructions which, when executed by any set of the one or more processors, perform a process. The process includes receiving, with an interface module of a computing system, form data related to a new and/or updated form having a plurality of data fields, gathering, with a data acquisition module of a computing system, training set data related to previously filled forms. Each previously filled form has completed data fields that each correspond to a respective data field of the new and/or updated form. The process also includes generating, with a machine learning module of a computing system, for a first selected data field of the plurality of data fields of the new and/or updated form, dependency data indicating one or more possible dependencies for an acceptable function that provides a proper data value for the first selected data field. The process also includes generating, with the machine learning module, for the first selected data field, candidate function data including a plurality of candidate functions based on the dependency data and one or more operators selected from a library of operators, generating, with the machine learning module, for each candidate function, test data by applying the candidate function to the training set data, and generating, with the machine learning module, for each candidate function, matching data by comparing the test data to the completed data fields corresponding to the first selected data field, the matching data indicating how closely the test data matches the corresponding completed data fields of the previously filled forms. The process also includes identifying, with the machine learning module, from the plurality of functions, an acceptable candidate function for the first selected data field of the new and/or updated form by determining, for each candidate function, whether or not the candidate function is an acceptable function for the first selected data field of the new and/or updated form based on the matching data, generating, with the machine learning module and after identifying the correct function for the first data field, results data indicating an acceptable function for the first data field of the new and/or updated form, and outputting, with the interface module, the results data.

Using the disclosed embodiments of a method and system for learning and incorporating new and/or updated forms in an electronic document preparation system, a method and system for learning and incorporating new and/or updated forms in an electronic document preparation system more accurately is provided. Therefore, the disclosed embodiments provide a technical solution to the long standing technical problem of efficiently learning and incorporating new and/or updated forms in an electronic document preparation system.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a system, the method comprising:
   receiving form data having a first data field for which a function needs to be determined;
   receiving training set data of a plurality of data values of data fields relating to the first data field, from a database;
   generating, for the first data field, one or more dependencies;
   generating, for the first data field, two or more distinct candidate functions based on the one or more dependencies and one or more operators from a library of operators, using a machine learning process based on genetic programming;
   generating, for each generated candidate function, test data by applying the candidate function to at least a portion of the training set data;
   generating matching data indicating how closely the test data matches at least a portion of the training set data;
   for at least two candidate functions having desirable fitness function results among the candidate functions:
      splitting, of the at least two candidate functions, a first candidate function into at least a first component piece and a second component piece using the machine learning process based on the genetic programming;
      assembling at least the first component piece from the first candidate function with at least a portion of a second candidate function, forming a new candidate function using the machine learning process based on the genetic programming; and
      iterating between at least the splitting and assembling operations until test data of at least one of the new candidate functions matches the training set data within a predefined margin of error or until the matching data reflects that the candidate functions are not being improved in each iteration, as shown by a relatively constant margin of error using the machine learning process based on the genetic programming; and
   incorporating at least one candidate function into an electronic document preparation system.

2. The method of claim 1, wherein:
   the training set data includes field data sets, each field data set including at least a data value for each field-related dependency and a data value for the first data field; and
   generating the test data comprises:
      substituting each field-related dependency appearing in the candidate function into the candidate function; and
      performing operators of the candidate function.

3. The method of claim 2, wherein generating the matching data comprises:
   comparing the test data associated with individual candidate functions with the data values for the first data field to determine whether the test data matches the data value for the first data field; and
   assigning points to each candidate function based on how many data values of the test data match the data value for the first data field.

4. The method of claim 1, wherein the one or more operators include one or more of a mathematical operator, logical operators, a string operator, a Boolean operator, or condition operators.

5. The method of claim 1, wherein the candidate functions generate numerical data values, Boolean data values, selection of a check box, or a text data value.

6. The method of claim 1, wherein the one or more dependencies include one or more of a second data field from a form associated with the first data field, multiple data fields from the form associated with the first data field, a data field from a form other than the form associated with the first data field, multiple data fields from multiple different forms, or a constant.

7. The method of claim 1, wherein the first data field is a field of a new tax form.

8. The method of claim 7, wherein the training set data includes previously prepared tax returns.

9. The method of claim 7, wherein the training set data includes fabricated tax returns.

10. A non-transitory computer-readable storage medium comprising instructions that, when executed by one or more processors of a system, cause the system to perform operations comprising:
   receiving form data having a first data field for which a function needs to be determined;
   receiving training set data of a plurality of data values of data fields relating to the first data field, from a database;
   generating, for the first data field, one or more dependencies;
   generating, for the first data field, two or more distinct candidate functions based on the one or more dependencies and one or more operators from a library of operators, using a machine learning process based on genetic programming;
   generating, for each generated candidate function, test data by applying the candidate function to at least a portion of the training set data;

generating matching data indicating how closely the test data matches at least a portion of the training set data;
for at least two candidate functions having desirable fitness function results among the candidate functions:
splitting, of the at least two candidate functions, a first candidate function into at least a first component piece and a second component piece using the machine learning process based on the genetic programming;
assembling at least the first component piece from the first candidate function with at least a portion of a second candidate function, forming a new candidate function using the machine learning process based on the genetic programming; and
iterating between at least the splitting and assembling operations until test data from at least one of the new candidate functions matches the training set data within a predefined margin of error or until the matching data reflects that the candidate functions are not being improved in each iteration, as shown by a relatively constant margin of error using the machine learning process based on the genetic programming; and
incorporating at least one candidate function into an electronic document management system.

11. A system comprising:
at least one processor; and
at least one memory storing instructions that, when executed by the at least one processor, cause the system to:
receive, with an interface module, form data having a first data field for which a function needs to be determined;
receive, with a data acquisition module, training set data of a plurality of data values of data fields relating to the first data field, from a database;
generate, for the first data field, one or more dependencies;
generate, for the first data field, two or more distinct candidate functions based on the one or more dependencies and one or more operators from a library of operators, using a machine learning process based on genetic programming;
generate, for each generated candidate function, test data by applying the candidate function to at least a portion of the training set data;
generate, matching data indicating how closely the test data matches at least a portion of the training set data;
for at least two candidate functions having desirable fitness function results among the candidate functions:
split, of the at least two candidate functions, a first candidate function into at least a first component piece and a second component piece using the machine learning process based on the genetic programming;
assemble, at least the first component piece from the first candidate function with at least a portion of a second candidate function, forming a new candidate function using the machine learning process based on the genetic programming; and
iterate, between at least the splitting and assembling operations until test data from at least one of the new candidate functions matches the training set data within a predefined margin of error or until the matching data reflects that the candidate functions are not being improved in each iteration, as shown by a relatively constant margin of error using the machine learning process based on the genetic programming; and
incorporate, at least one candidate function into an electronic document management system.

12. The system of claim 11, wherein:
the training set data includes field data sets, each field data set including at least a data value for each field related dependency and a data value for the first data field; and
generating the test data comprises:
substituting each field-related dependency appearing in the candidate function into the candidate function; and
performing operators of the candidate function.

13. The system of claim 12, wherein generating the matching data comprises:
comparing, with the machine learning process based on the genetic programming, the test data associated with individual candidate functions with the data value for the first data field to determine whether the test data matches the data value for the first data field; and
assigning, with the machine learning process based on the genetic programming, points to each candidate function based on how many data values of the test data match the data value for the first data field.

14. The system of claim 11, wherein the one or more operators include one or more of a mathematical operator, logical operators, a string operator, a Boolean operator, or condition operators.

15. The system of claim 11, wherein the candidate functions generate numerical data values, Boolean data values, selection of a check box, or a text data value.

16. The system of claim 11, wherein the one or more dependencies include one or more of a second data field from a form associated with the first data field, multiple data fields from the form associated with the first data field, a data field from a form other than the form associated with the first data field, multiple data fields from multiple different forms, or a constant.

* * * * *